United States Patent [19]

Potash et al.

[11] Patent Number: 4,893,318

[45] Date of Patent: * Jan. 9, 1990

[54] METHOD FOR REFERENCING MULTIPLE DATA PROCESSORS TO A COMMON TIME REFERENCE

[75] Inventors: Richard J. Potash, Dedham, Mass.; Steven K. Burns, Durham, N.H.

[73] Assignee: Computer Sports Medicine, Inc., Waltham, Mass.

[*] Notice: The portion of the term of this patent subsequent to Nov. 21, 2006 has been disclaimed.

[21] Appl. No.: 148,565

[22] Filed: Jan. 26, 1988

[51] Int. Cl.$^4$ .............................................. H04L 7/00
[52] U.S. Cl. ..................................... 375/109; 455/69; 364/569
[58] Field of Search ....................... 375/107, 109, 106; 455/69; 364/569; 342/88

[56] References Cited

U.S. PATENT DOCUMENTS 3,128,465 4/1964 Brilliant ............................... 375/109
3,250,896 5/1966 Perkinson et al. .................. 375/109
4,807,259 2/1989 Yamanaka et al. ................. 375/109

OTHER PUBLICATIONS

Richard Wallace; "Time Source Synchronizes Computers in Networks", 9/21/87; Electronic Engineering Times; p. 24.
D. L. Mills; "Network Time Protocol"; 9/85; M/A-Com Linkabit.
D. L. Mills; "Experiments in Network Clock Synchronization"; M/A-Com Linkabit; 9/85.

Primary Examiner—Benedict V. Safourek
Assistant Examiner—Marianne Huseman
Attorney, Agent, or Firm—Arthur L. Lessler

[57] ABSTRACT

A master (virtual) clock is situated at a central data gathering station, and slave (physical) clocks are situated at one or more (functionally or spatially) remote stations. Time signals are exchanged between the master clock at the central station and each slave clock at each corresponding remote station. From these signals (i) the ratio between the frequencies of the central station master clock and the corresponding remote station slave clock is determined, (ii) the difference in reference (starting) time value between the central station master clock and the corresponding remote station slave clock is determined, and (iii) the transmission time between the central station master clock and the corresponding remote station slave clock is determined. Averages of the clock ratio, reference time, and transmission time are determined across successive time signals to provide improved accuracy. The clock ratio and reference time values are used to derive data referenced to the master clock at the central station from data collected via the slave clock at the remote stations so that the time and data values associated with the data correspond to time and data values generated by the master clock at the central station. If desired, a (virtual) master clock can be determined having time values which are the average of the master clock and all slave clock time values.

43 Claims, 13 Drawing Sheets $$t_{ref} = [(MT_0 + MT_1) - (ST_0 + ST_1) * k_{clkratio}]/2$$

$$= [(2:00:00.07 + 3:00:00.00) - (2:00:00.00 + 4:00:00.14) * 0.50]/2$$

$$= [5:00:00.07 - 6:00:00.14 * 0.50]/2$$

$$= [5:00:00.07 - 3:00:00.07]/2$$

$$= [2:00:00.00]/2$$

$$= 1:00:00.00$$

$$T_{TR} = [(MT_0 - MT_1) + (ST_1 - ST_0) * k_{clkratio}]/2$$

$$= [(2:00:00.07 - 3:00:00.00) + (4:00:00.14 - 2:00:00.00) * 0.50]/2$$

$$= [-0:59:59.93 + 2:00:00.14 * 0.50]/2$$

$$= [-0:59:59.93 + 1:00:00.07]/2$$

$$= [0:00:00.14]/2$$

$$= 0:00:00.07$$

SHEET 1

SHEET 2

$x = \{s[ST]\}$  SATELLITE CLOCK SAMPLES $\bullet = \{s[MT]\}$  GROUND STATION CLOCK SAMPLES $s[ST] = s(t)\big|_{t_{ST} = nT_{ST} + \phi}$ $s[MT] = s(t)\big|_{t_{MT} = nT_{MT}}$ Txx = SAMPLING PERIOD OF CLOCK xx $\phi$ = REFERENCE TIME DIFFERENCE BETWEEN ST AND MT

METHOD FOR REFERENCING MULTIPLE DATA PROCESSORS TO A COMMON TIME REFERENCE

BACKGROUND OF THE INVENTION

This invention relates to a method for establishing a common time reference among two or more systems or subsystems dealing with time-dependent information, and is particularly applicable to distributed data acquisition and/or data processing systems.

There are many applications in which it is either necessary or desirable to distribute the acquisition or processing of data over a number of computer-controlled stations, usually for reasons related to distance between data-receiving transducers or the need for dividing up a very heavy workload into more manageable sub-parts, with each sub-part being handled by a separate processor. Real-time data acquisition and processing, e.g. monitoring of a common event by multiple stations, process control monitoring, and sequence of events recording are among the many environments which require multiple autonomous data and control streams. Additionally, these tasks demand that the temporal relationships between the data and/or control streams of the various stations involved be preserved.

Thus, because of either the spatial requirements or the intense input-output and computational requirements of such data acquisition and/or processing systems, the control and data streams are often distributed among many processors. In order to maintain time synchronization between the data and control streams of the processors, current systems depend on:

1. Shared hardware for their synchronization, typically a common clock and reset line, requiring a direct connection between the common clock and each of the stations to be synchronized to the common clock; or 2. Where a direct connection is not feasible, the wireless transmission of time information from a common clock to each of the stations. In such cases temporal uncertainty due to communications delay determines the overall error in time resolution of the system.

Even where a direct connection is employed, temporal uncertainty limits system time resolution when the distances between stations are substantial.

In a system having multiple stations it is desirable for each station to have its own clock, often because it is not feasible for each station to share a single clock; and so that the station can continue operating even if communication with the common clock is temporarily lost. However, such individual clocks may operate at slightly different frequencies, and begin at different reference times, further compounding the time resolution/synchronization problem.

One arrangement for synchronizing multiple processors is described in an article entitled "Time Source Synchronizes Computers In Networks", published in the Sept. 21, 1987 edition of Electronic Engineering Times. This arrangement utilizes specialized hardware to maintain local clocks synchronized to a national standard.

Accordingly, an object of the present invention is to provide a method for referencing the clocks of multiple stations (which can, but need not necessarily be data acquisition/processing stations) to a common time base.

Another object of the invention is to provide such a method which is capable of minimizing the effects of variations in clock frequency among the various clocks involved.

A further object of the invention is to provide such a method which is capable of minimizing the effects of variations in reference time among the various clocks involved.

Still another object of the invention is to provide such a method which is capable of minimizing the adverse effects of transmission time and variations therein.

A still further object of the invention is to provide a method having one or more of the aforementioned features which is amenable to processing accumulated time information to derive information referenced to a desired time standard from information referenced to a given time standard.

Yet another object of the invention is to meet the aforementioned objectives through the use of standard data communications means and standard computer operating systems.

SUMMARY OF THE INVENTION

The present invention provides a method for relating the time and/or information values associated with data collected in accordance with time information provided by at least one slave (physical) clock to correspond to values provided by data collected in accordance with time information provided by a master (virtual) clock. According to the invention, these time values are preferably changed in a batch process after the data has been collected.

As herein described, there is provided a method for determining the frequency relationship between at least one slave clock and a master clock, wherein the master clock provides a master clock time signal and the slave clock provides a slave clock time signal. A time interval commencement signal is transmitted from the master clock to the slave clock. The time interval commencement signal has a value corresponding to the value of the master clock time signal when the time interval commencement signal is transmitted. A time interval termination signal is subsequently transmitted from the master clock to the slave clock. The time interval termination signal has a value corresponding to the value of the master clock time signal when the time interval termination signal is transmitted.

After receipt of the time interval termination signal at the slave clock, the ratio of the two clock frequencies is computed as the ratio of (i) the difference between the values of the time interval commencement and time interval termination signals to (ii) the elapsed time between reception of the time interval commencement and time interval termination signals as determined by the slave clock. Increased accuracy is provided by an increased elapsed time between the time interval commencement and termination signals.

According to another aspect of the invention there is provided a method for establishing a reference time of at least one slave clock to correspond with the reference time of a master clock, wherein the master clock provides a master clock time signal and the slave clock provides a slave clock time signal.

According to this aspect of the invention, a first reference time signal is transmitted from the slave clock to the master clock, said signal having a value corresponding to the value of the slave clock time signal when the first reference time signal is transmitted. A second reference time signal is subsequently transmitted from the master clock to the slave clock, said signal having a value corresponding to the value of the master clock time signal when the first reference time signal was received by the master clock. A third reference time signal is transmitted from the master clock to the slave clock, said signal having a value corresponding to the value of the master clock time signal when the third reference time signal is transmitted.

After receipt of the third reference time signal at the slave clock, the reference time is computed by:

adding the value of said slave clock time signal at the time of transmission of said first reference signal, to the value of said slave clock time signal at the time of reception of said third reference signal at said slave clock, to obtain a first subtotal value;

multiplying said first subtotal value by the ratio of the frequency of said master clock to the frequency of said slave clock to obtain an adjusted subtotal value;

subtracting said adjusted subtotal value from the sum of the values of said second and third reference time signals, to obtain a further adjusted subtotal value; and dividing said further adjusted subtotal value by two to obtain the reference time value.

Repeated transmissions can be averaged to realize increased accuracy.

According to still another aspect of the invention there is provided a method for determining the transmission time between a slave clock and a master clock, wherein the master clock provides a master clock time signal and the slave clock provides a slave clock time signal.

According to this aspect of the invention, a first reference time signal is transmitted from the slave clock to the master clock, said signal having a value corresponding to the value of the slave clock time signal when the first reference time signal is transmitted. A second reference time signal is subsequently transmitted from the master clock to the slave clock, said signal having a value corresponding to the value of the master clock time signal when the first reference time signal was received by the master clock. A third reference time signal is transmitted from the master clock to the slave clock, said signal having a value corresponding to the value of the master clock time signal when the third reference time signal is transmitted.

After receipt of the third reference time signal at the slave clock, the value of the transmission time (i.e. the time required for transmission of a signal between the master and slave clocks) may be determined by:

subtracting the value of said third reference time signal from the value of said second reference time signal, to obtain a first subtotal value;

subtracting the value of said slave clock time signal at the time of transmission of said first reference time signal from the value of said slave clock time signal at the time of reception of said third reference time signal at to obtain a second subtotal value;

multiplying said second subtotal value by the ratio of the frequency of said master clock to the frequency of said slave clock to obtain an adjusted second subtotal value;

adding said first subtotal value to said adjusted second subtotal value, and dividing the resulting value by two to obtain the transmission time value.

Repeated transmissions can be averaged to provide increased accuracy.

PRINCIPLES OF THE PRESENT INVENTION

Where a system is operated with multiple clocks, each clock normally operates by counting clock pulses generated by a local oscillator, and by incrementing a counter in accordance with the number of pulses counted.

In order to insure that data acquired by multiple data gathering stations (each station having its own clock) relating to an event is properly coordinated, all clocks should indicate the same "absolute" (counter) time. However, this is not possible due to (i) small differences in frequency between the clocks, (ii) differences in the starting (reference) times of the clocks, and (iii) delays in the time required for transmission of time signals from one clock to another.

The present invention provides methods for determining the frequency ratios, reference times, and transmission times between the clocks, with a very high degree of accuracy, so that data obtained via the clocks can be temporally resolved to an extent beyond the limits of the system hardware and not heretofore possible.

The term "clock" as used in this application, refers to an arrangement which includes at least a local oscillator for generating periodic clock signals, and a counter for counting the clock signals to generate a clock time signal. A master clock generates a master clock time signal and each slave clock generates its own slave clock time signal. Each slave clock is associated with a corresponding data collecting station.

According to a preferred embodiment of the invention, a master clock is situated at a central data gathering station, and slave clocks are situated at one or more (functionally or spatially) remote stations. Time signals are exchanged between the master clock at the central station and each slave clock at the corresponding remote station. From these signals (i) the ratio of the frequencies of the central station master clock and the corresponding remote slave clock is determined, (ii) the reference time between the central station master clock and the corresponding remote slave clock is determined and (iii) the transmission time between the central station master clock and the corresponding remote slave clock is determined.

The time interval over which the ratio of the frequencies of the master and slave clocks is determined is preferably as long as is practicable, for greatest accuracy.

In order to obtain as accurate a calculation of the reference time and transmission time as possible, the number of signals exchanged between the master and slave clocks should be as great as possible. These signals are averaged to provide improved accuracy.

The clock ratio values and reference time values are used to insure that data collected via the slave clocks can be temporally adjusted and reliably combined. If desired, all clocks can be referred to a common time which is the average of the reference times of the various clocks, and/or to a common frequency which is the average of the frequencies of the oscillators in the various clocks.

Figure 1:
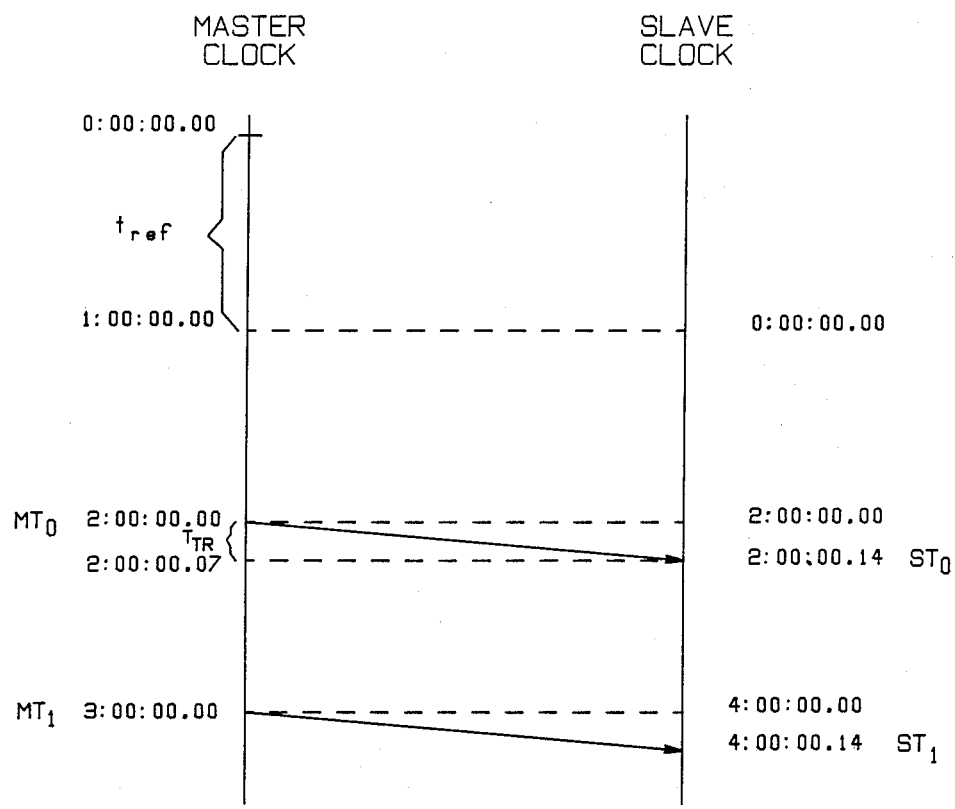
FIG. 1 is a diagram illustrating principles of the present invention involved in the determination of the difference in frequency between the slave clock at one of a number of data gathering and/or processing stations and the master clock at a central station.

The manner in which the slave clock local oscillator frequency is referenced to the frequency of the master clock oscillator is illustrated in FIG. 1.

Figure 2:
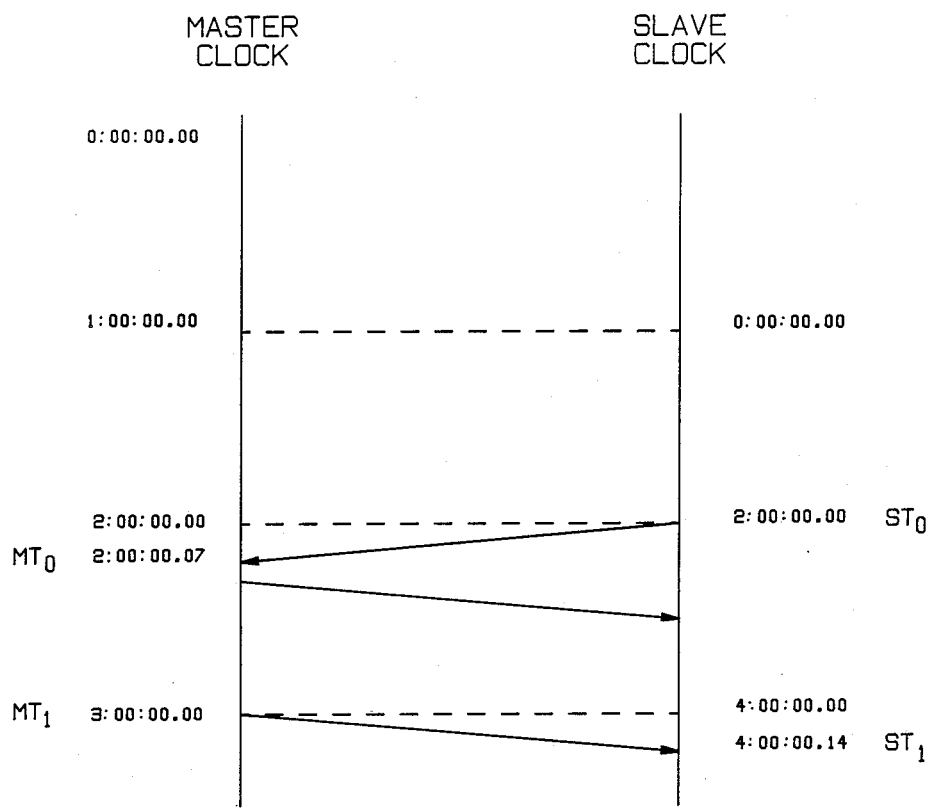
FIG. 2 is a diagram illustrating principles of the present invention involved in the determination of the difference between the reference time of a slave clock at one of a number of data gathering and/or processing stations and the reference time of a master clock at the central station, as well as the transmission time between said clocks.

In FIGS. 1 and 2 time values are shown in HH:MM:SS.FF form, where HH=hours, MM=minutes, SS=seconds and FF denotes the number of hundredths of a second.

A time signal sequence is initiated by, for example, the master clock transmitting to the slave clock a first time signal (which may be a time interval commencement signal) having a value $MT_0$ corresponding to the master clock time at which the signal is sent, e.g. 2:00:00.00 p.m. (i.e., two hours after the master clock starting time of 0:00:00.00 as measured by the master clock). Assuming a 0.07 second (as measured by the master clock) transmission time, that the master clock has a local oscillator operating at one-half the frequency of the slave clock local oscillator, and that the master clock is initially running 1:00:00.00 (one hour) ahead of the slave clock, the slave clock would receive the first signal (with value $MT_0$) at a time $ST_0$ of 2:00:00.14 p.m. as determined by the slave clock.

A second time signal (which may be a time interval termination signal) $MT_1$ with master clock value of 3:00:00.00 p.m. is transmitted to the slave clock. The slave clock would receive the second time signal (with value $MT_1$ at a time $ST_1$ of 4:00:00.14 p.m. as determined by the slave clock.

The clock ratio $k_{clkratio}$, i.e. the ratio of the master clock local oscillator frequency to the slave clock local oscillator frequency, is given by the ratio of the elapsed time between transmission of the first (time interval commencement) and second (time interval termination) signals as measured by the master clock, to the elapsed time between reception of those signals as measured by the slave clock.

In this example, the ratio would be $k_{clkratio}$=(3:00:00.00−2:00:00.00)/(4:00:00.14−2:00:00.14)=1:00:00.00/2:00:00.00=0.50.

The manner in which the reference time of the slave clock is referenced to that of the master clock is illustrated in FIG. 2.

A first time signal $ST_0$ is transmitted from the slave clock to the master clock. The first time signal has a value corresponding to the value of the slave clock time signal at the time when the first time signal is transmitted, i.e. 2:00:00.00 p.m.

A second time signal $MT_0$ is subsequently transmitted from the master clock to the slave clock. The second time signal has a value corresponding to the value of the master clock time signal when the first time signal was received by the master clock, i.e. 2:00:00.07 p.m.

A third time signal $MT_1$ is subsequently transmitted from the master clock to the slave clock. The third time signal has a value corresponding to the value of the master clock time signal when the third time signal was transmitted by the master clock, i.e. 3:00:00.00 p.m. The slave clock would receive the third signal (with value $MT_1$) at a time $ST_1$ of 4:00:00.14 p.m. as determined by the slave clock.

Upon receipt of the second and third time signals at the slave clock, the slave clock determines the reference time $t_{ref}$ by subtracting (i) the sum of the measured times on its clock (6:00:00.14) times the clock frequency ratio (0.50) from (ii) the sum of the measured times at the master clock between reception of the first time signal and transmission of the third time signal (5:00:00.07), and dividing the difference by 2, to yield a reference time of 1:00:00.00. [(2:00:00.07+3:00:00.00)−(2:00:00.00+4:00:00.14) * 0.50]/2=1:00:00.00.

The slave clock then determines the transmission time $T_{TR}$ by adding (i) the time difference at the master clock between transmission of the third time signal and reception of the first time signal (−0:59:59.93) to (ii) the time that has transpired on its clock (2:00:00.14) times the clock ratio (0.50), and dividing the sum by 2, to yield a transmission time of 0.07 seconds. [(2:00:00.07−3:00:00.00)+(4:00:00.14−2:00:00.00) * 0.50]/2=0.07.

In order to improve the accuracy of determining the parameters $k_{clkratio}$, $t_{ref}$, and $T_{TR}$ the average of successive measurements of the time signals is used. The measurements of $k_{clkratio}$ can be carried out from time to time, but the accuracy of the measurement is determined by the total interval over which the measurements are made.

The measurements of $t_{ref}$ and $T_{TR}$ can be carried out from time to time, but measurements based upon multiple time exchanges are preferred for greatest accuracy.

The equations that apply to the foregoing operations are:

$$k_{clkratio} = (MT_1 - MT_0)/(ST_1 - ST_0) \quad (1)$$

$$t_{ref} = [(MT_0 + MT_1) - (ST_0 + ST_1) * k_{clkratio}]/2 \quad (2)$$

$$T_{TR} = [(MT_0 - MT_1) + (ST_1 - ST_0) * k_{clkratio}]/2 \quad (3)$$

The slave clock recalculated (virtual clock) time $T_{vc}$ is given by $$T_{vc} = t_{ref} + n_{pc} * k_{clkratio} \quad (4)$$

where $n_{pc}$ is the number of periodic slave clock time increment signals generated.

DETAILED DESCRIPTION

According to the synchronization technique of the present invention, the clock system at each (spatially or functionally) remote station models a virtual or "world" clock (e.g. the master clock at the central station) in terms of its own local physical (slave) clock; and uses information gathered from communication with the master clock to closely approximate the model's parameters.

The following mathematical model of time is used:

$$T_{vc} = t_{ref} + n_{pc} * k_{clkratio} \quad (5)$$

Where $T_{vc}$, the virtual (master) clock time (i.e. the adjusted slave clock time), is an absolute quantity expressed in terms of the modeling parameter $t_{ref}$ (the reference time of the virtual clock) and $k_{clkratio}$ (the ratio between the frequencies of the virtual (master) clock and the physical (slave) clock) and the physical parameter $n_{pc}$ (the number of ticks or periods which have elapsed on the physical (slave) clock in the remote processor).

By using a small part of its computational power to process message based exchanges of time data with another (master clock) processor, the processor at each station determines the parameters $t_{ref}$ and $k_{clkratio}$ and thus can compute the virtual (master) clock time $T_{vc}$ from $n_{pc}$, its physical (slave) clock time and vice versa.

Figure 3:
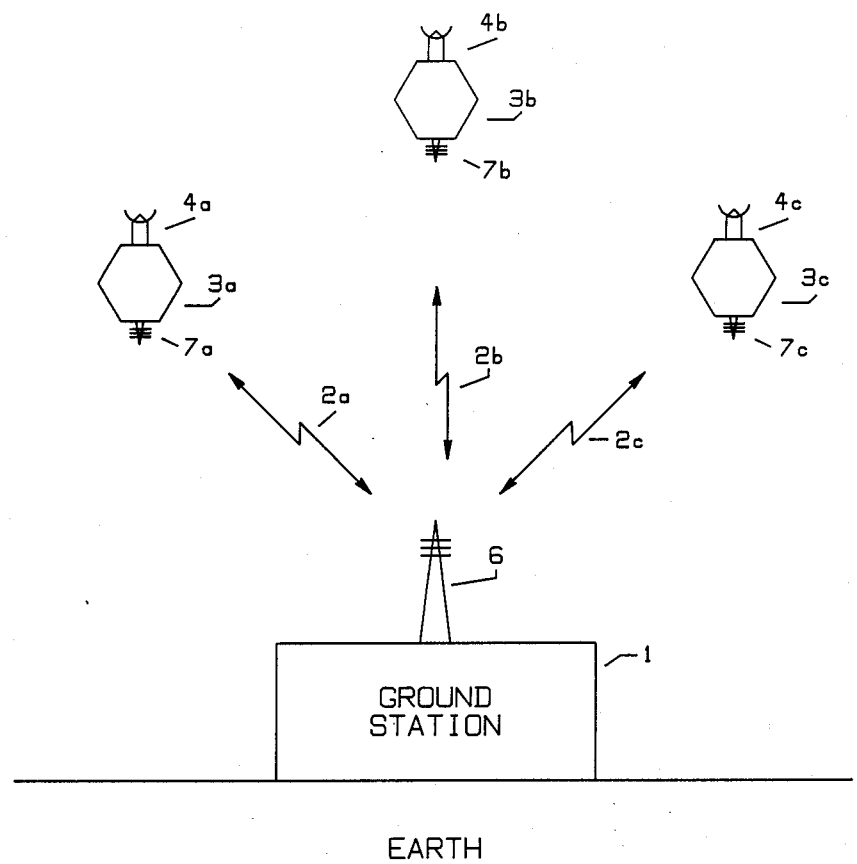
FIG. 3 is a diagram of a set of three data acquisition radar satellite stations communicating with a common central ground station.

The system depicted in FIG. 3 consists of a ground station 1 and a number of satellites 3a, 3b and 3c. The ground station 1 communicates with the satellites via transmissions over bidirectional radio links 2a, 2b and 2c respectively. The ground station has a radio transmitting/reception antenna 6 while the satellites have radio transmission/reception antennae 7a, 7b and 7c respectively. Each satellite contains a radar system (4a, 4b, 4c).

The ground station 1 sends a message to each of the satellites telling them what time to send a radar pulse toward an area where it is desired to detect an object. The radar pulses must be sent from all satellites at the same time, or at times coordinated so that a desired phased array effect can be achieved.

Upon sending its radar pulse, each satellite samples the amplitude of the incoming signals received at its radar dish and determines the slave clock time when the peak (maximum amplitude) signal occurred. Each peak occurrence time value along with the corresponding sampled data values are stored as a data set in the memory of the satellite processor.

For the ground station to compare the data streams from the group of satellites, the satellites must each measure time by the same standard, i.e. a common virtual clock from which to temporally reference their data.

Accordingly, the peak time occurrence and sampled data values contained in the data sets are processed by the satellite time referencing system to derive new values such that the associated time values correspond to the master clock time at which the event occurred and the associated data values correspond to data points at sample times referenced to the master clock. This processing or time referencing can be performed as a batch process after all or a predetermined amount of data has been collected.

The virtual clock referenced peak signal occurrence time is then transmitted to the ground station.

The ground station compares the received peak occurrence data from the set of satellites and determines if an object has been detected. If so, the satellites are instructed to send their complete sets of data samples for further analysis by the ground station.

Since the ground station equipment is under fewer constraints than the satellites, it makes sense to provide it with a very accurate and reliable absolute or "master" clock and use it as the "virtual" clock to which all the satellites must relate time. Each satellite then computes the model parameters $t_{ref}$ and $k_{clkratio}$ and adjusts or corrects "slave" clock time acquired data values such that the data sent to the ground station is as though the satellites used the actual ground station master clock as their time base for the data acquisition.

Additionally, each satellite synchronizes all its actions relative to the ground station master clock. While the accuracy of synchronization of such actions is limited by the physical hardware involved, the accuracy of referencing time acquired data values to the virtual clock in a batch process after the data has been collected, can be greater. The time a "synchronized" event occurred can be measured and referenced with an accuracy beyond the resolution of the generating hardware.

Figure 4:
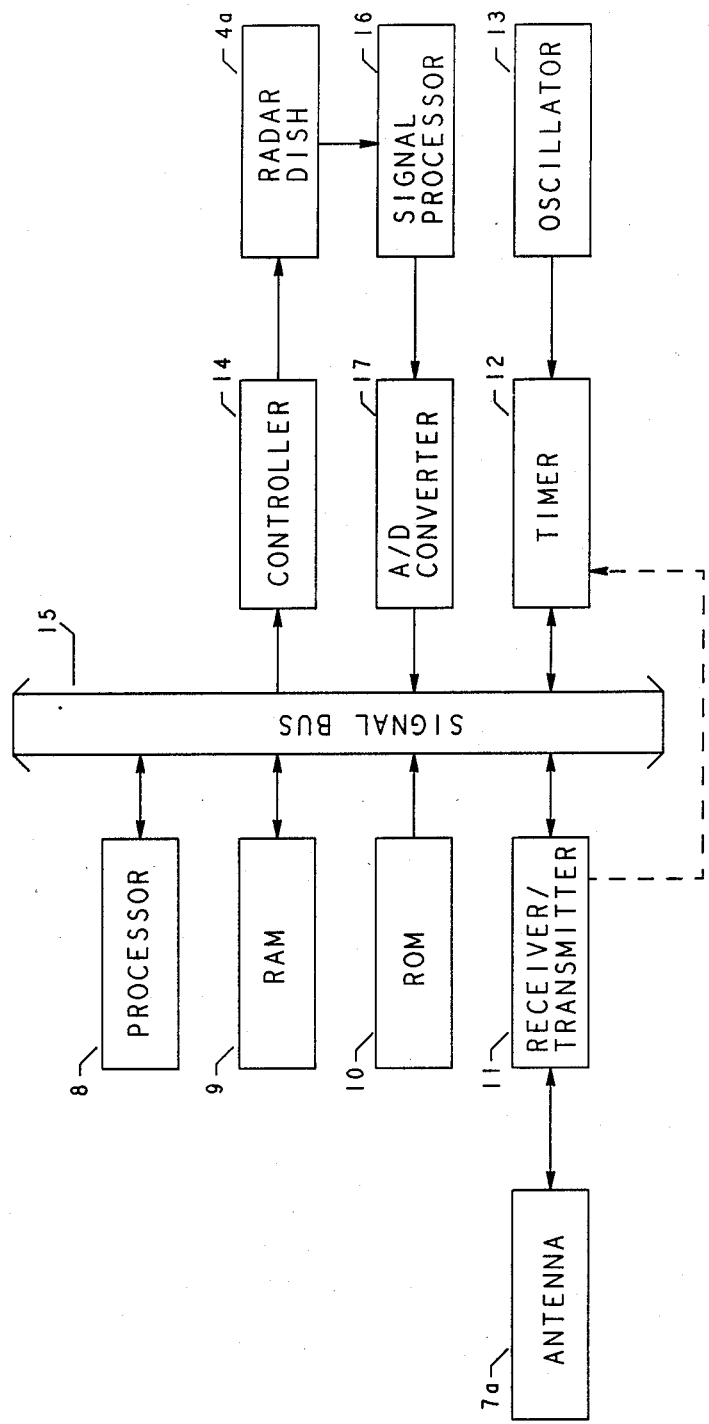
FIG. 4 is a block diagram of the data acquisition circuitry of one of said satellite stations.

FIG. 4 shows a block diagram of the data acquisition and synchronization circuitry of one of said satellite stations.

The data processor 8 controls the system and performs the computations associated with the time corrections.

The random access memory or RAM 9 contains the timing variables ($t_{ref}$, $k_{clkratio}$), the raw collected data, and the time-synchronized collected data.

The read only memory or ROM 10 contains the programs associated with system control and time-synchronization.

The receiver/transmitter 11 communicates with the ground station via the antenna 7a.

The timer 12 is a simple counter driven by the local oscillator 13, and provides the measure of the time a time signal is transmitted or received.

The oscillator 13 provides the driving frequency for the timer 12, which counts pulses derived from the oscillator. The frequency of the oscillator cannot be set exactly and thus will vary slightly among the satellites.

The controller 14 receives commands from the data processor 8 via the common signal bus 15 and sends out radar pulses via the radar dish 4a.

Radar signals received by the radar dish 4a are coupled to the signal processor 16, which transforms them to levels acceptable for the analog-to-digital (A/D) converter 17.

The A/D converter 17 receives the analog data from the signal processor 16 and converts it to a stream of digital data for the data processor 8.

Determination of the Time Parameters

Transmission Time Model

Figure 5:
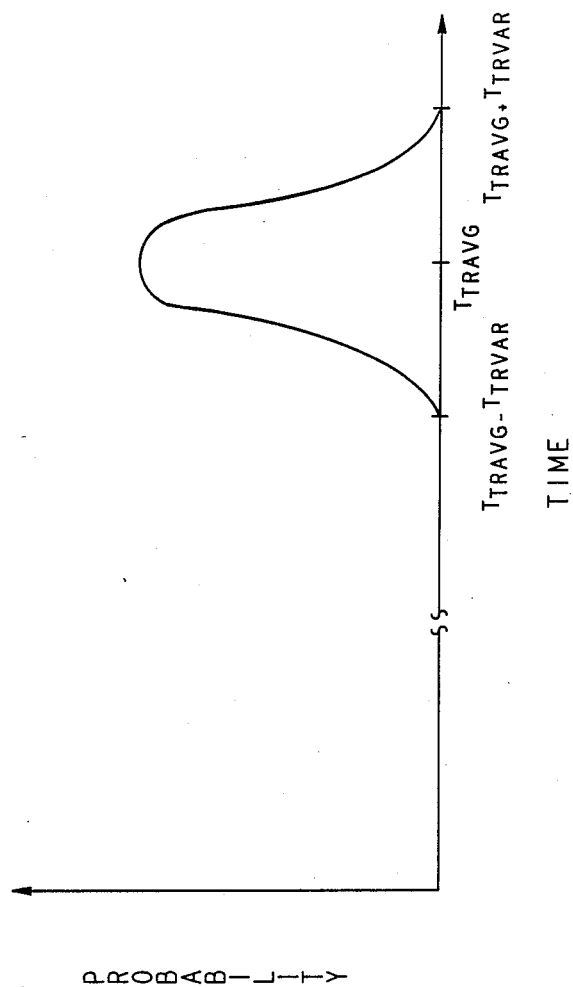
FIG. 5 is a graph showing the probability distribution of the signal transmission time between one of the satellite stations and the ground station.

Time values are bidirectionally transmitted between the ground station and the satellites, as previously described. The transmission time $T_{TR}$ is defined as the time required for the time message to be generated, transmitted, received and acted upon. The uncertainty of the time period required for the transmission of time information can be reduced by directly linking the timer 12 to the receiver/transmitter 11, as shown by the dashed line in FIG. 4. $T_{TR}$ can be modeled as an average value $T_{TRavg}$ with a limited variation $T_{TRvar}$. (See FIG. 5). That is, $$T_{TR} = T_{TRavg} \pm T_{TRvar} \qquad (6)$$

If deviations in $T_{TR}$ from $T_{TRavg}$ are essentially independent, then averaging successive observations of $T_{TR}$ should improve the determination of $T_{TRavg}$ by the square root of the number of observations. The techniques of the present invention make extensive use of this averaging to increase the system performance of the system beyond the limits imposed by a single determination of $T_{TRavg}$.

The present invention utilizes the time of transmission of a time signal as measured by the transmitter's clock and the time of reception of the same time signal as measured by the receiver's clock. The absolute time difference between transmission and reception of a time signal is defined as the transmission time. Thus, Equation (5) must be modified to account for the transmission time when equating transmission and reception time values.

For time signals transmitted from the master clock to the slave clock, the equation becomes:

$$MT = ST * k_{clkratio} + t_{ref} - T_{TR} \qquad (7)$$

For time signals transmitted from the slave clock to the master clock, the equation becomes:

$$MT - T_{TR} = ST * k_{clkratio} + t_{ref} \qquad (8)$$

Determination of the Ratio of the Ground Station (Master) and Satellite (Slave) Clock Frequencies The technique employed for the determination by a satellite of the difference between its (slave) clock frequency and the ground station's (master) clock frequency is to measure the same elapsed time interval with the ground station clock and the satellite clock. The measured value of elapsed time is directly proportional to the measuring clock's frequency. Thus the ratio of the measurements of elapsed time provides a value for $k_{clkratio}$.

Figure 6:
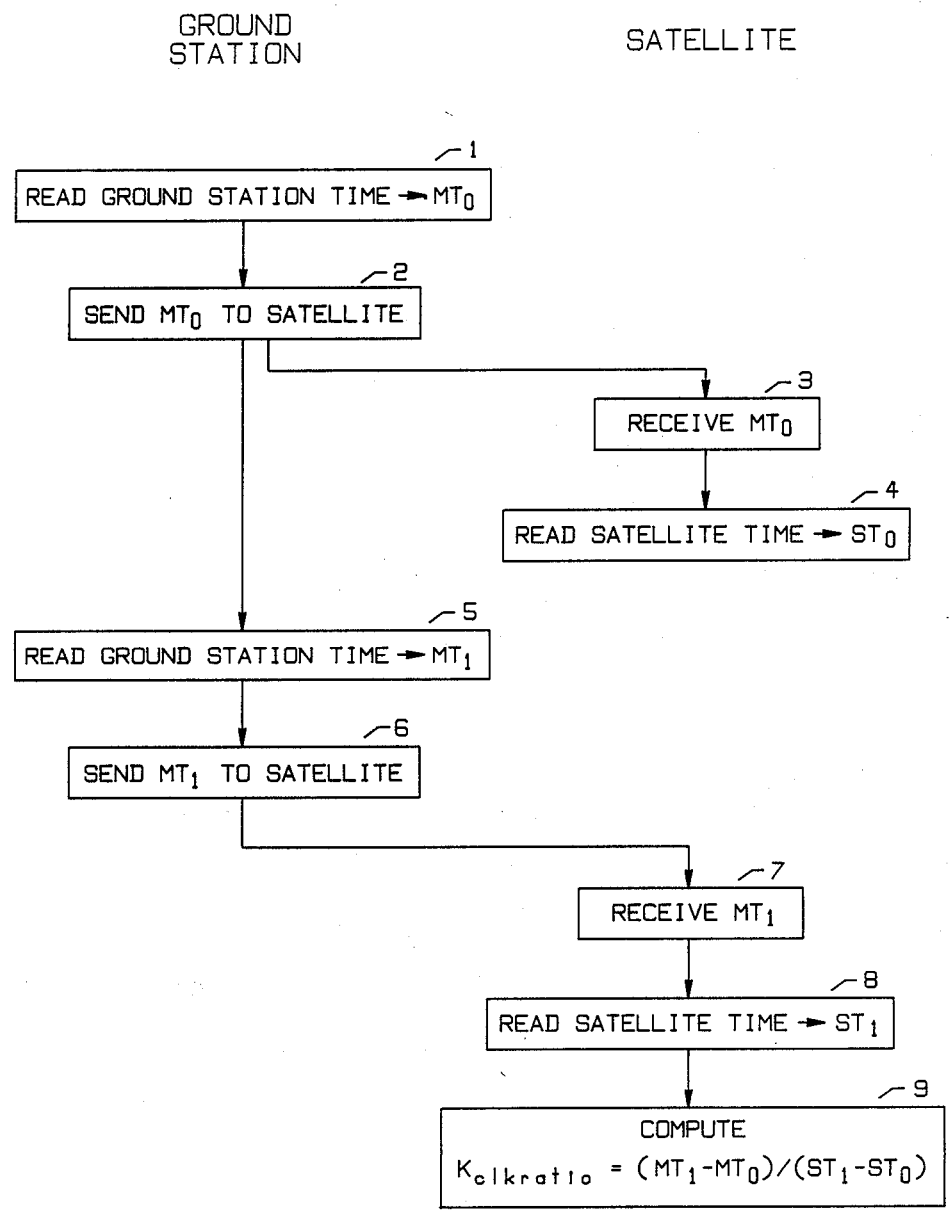
FIG. 6 is a flow chart showing the signal processing steps which take place at said one satellite station and at the ground station for the determination of the ratio ($k_{clkratio}$) between the frequency of the master clock at the ground station and the frequency of the slave clock at the satellite station.
Figure 7:
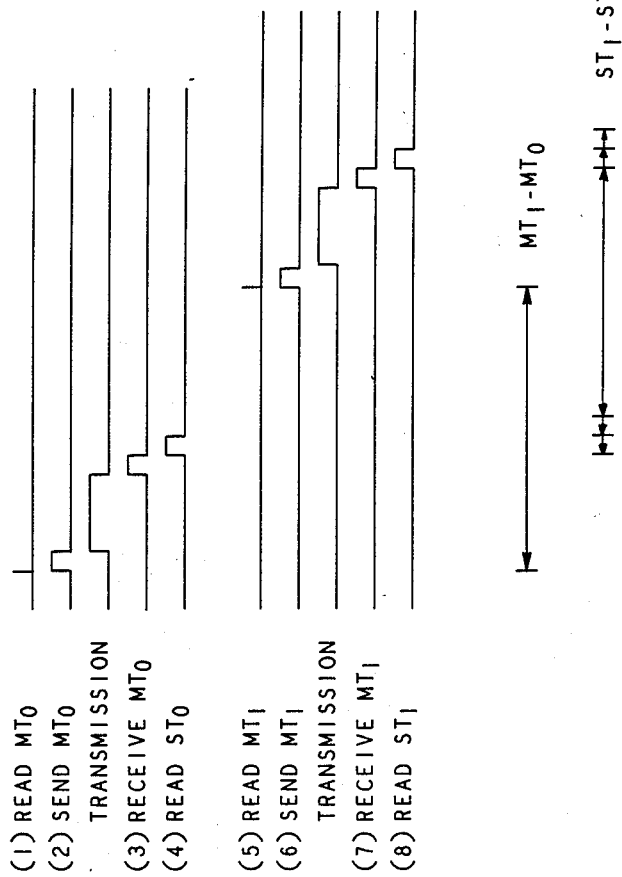
FIG. 7 is a timing diagram for the determination of the frequency radio $k_{clkratio}$ by said one satellite station.

As seen in FIG. 6, at time $MT_0$ the ground station records the time on its clock (Step 1). The ground station then sends a message to the satellite (Step 2) containing the time value $MT_0$. The satellite receives the message (Step 3) and reads the time $ST_0$ on its clock (Step 4).

At time $MT_1$ the ground station records the time on its clock (Step 5). The ground station then sends a message to the satellite (Step 6) containing the time value $MT_1$. The satellite receives the message (Step 7) and reads the time $ST_1$ on its clock (Step 8).

The satellite now has the values $ST_0$, $ST_1$, $MT_0$ and $MT_1$.

Substituting the pairs of time values ($MT_0$, $ST_0$) and ($MT_1$, $ST_1$) into Equation (7) yields:

$$MT_0 = ST_0 * k_{clkratio} + t_{ref} - T_{TR} \qquad (9)$$

$$MT_1 = ST_1 * k_{clkratio} + t_{ref} - T_{TR} \qquad (10)$$

Subtracting (9) from (10):

$$(MT_1 - MT_0) = (ST_1 - ST_0) * k_{clkratio} + t_{ref} - t_{ref} - T_{TR} + T_{TR} \qquad (11)$$

The $t_{ref}$ terms cancel because $t_{ref}$ is a constant defining the relationship between the starting times of the two clocks.

Substituting Equation (6) into Equation (11) yields:

$$(MT_1 - MT_0) = (ST_1 - ST_0) * k_{clkratio} - T_{TRavg} \pm T_{TRvar} + T_{TRavg} \pm T_{TRvar} \qquad (12)$$

The average transmission time $T_{TRavg}$ about which the transmission time varies (by an amount corresponding to $T_{TRvar}$) is a constant, so that the $T_{TRavg}$ terms cancel. Thus the full equation for $k_{clkratio}$ is:

$$k_{clkratio} = \frac{(MT_1 - MT_0)}{(ST_1 - ST_0)} +/- \frac{2 * T_{TRvar}}{(ST_1 - ST_0)} \qquad (13)$$

The satellite now makes an estimate of $k_{clkratio}$ (Step 9) using Equation (14):

$$k_{clkratio} = (MT_1 - MT_0)/(ST_1 - ST_0) \qquad (14)$$

It can be seen that the maximum error in this estimate of $k_{clkratio}$ is:

$$Error_{max} = \pm 2 * T_{TRvar}/(ST_1 - ST_0) \qquad (15)$$

In order to reduce the error and thus improve the accuracy of the estimate, the master clock transmits subsequent time interval termination signals. The slave clock uses the most recently received termination signal (transmitted at time $MT_n$ as measured by the master clock and received at time $ST_n$ as measured by the slave clock) to compute a more accurate estimate of $k_{clkratio}$ using Equation (16):

$$k_{clkratio} = (MT_n - MT_0)/(ST_n - ST_0) \qquad (16)$$

thus reducing the error term toward zero as the time interval $ST_n - ST_0$ approaches infinity.

Determination of Reference Time

The reference time determination method of the present invention yields best results when the average transmission time from the ground station to the satellite is equal to the average transmission time from the satellite to the ground station, as is normally the case; and when the technique described in this application for determining the relationship between the frequencies of the master and slave clocks is also employed.

Figure 8:
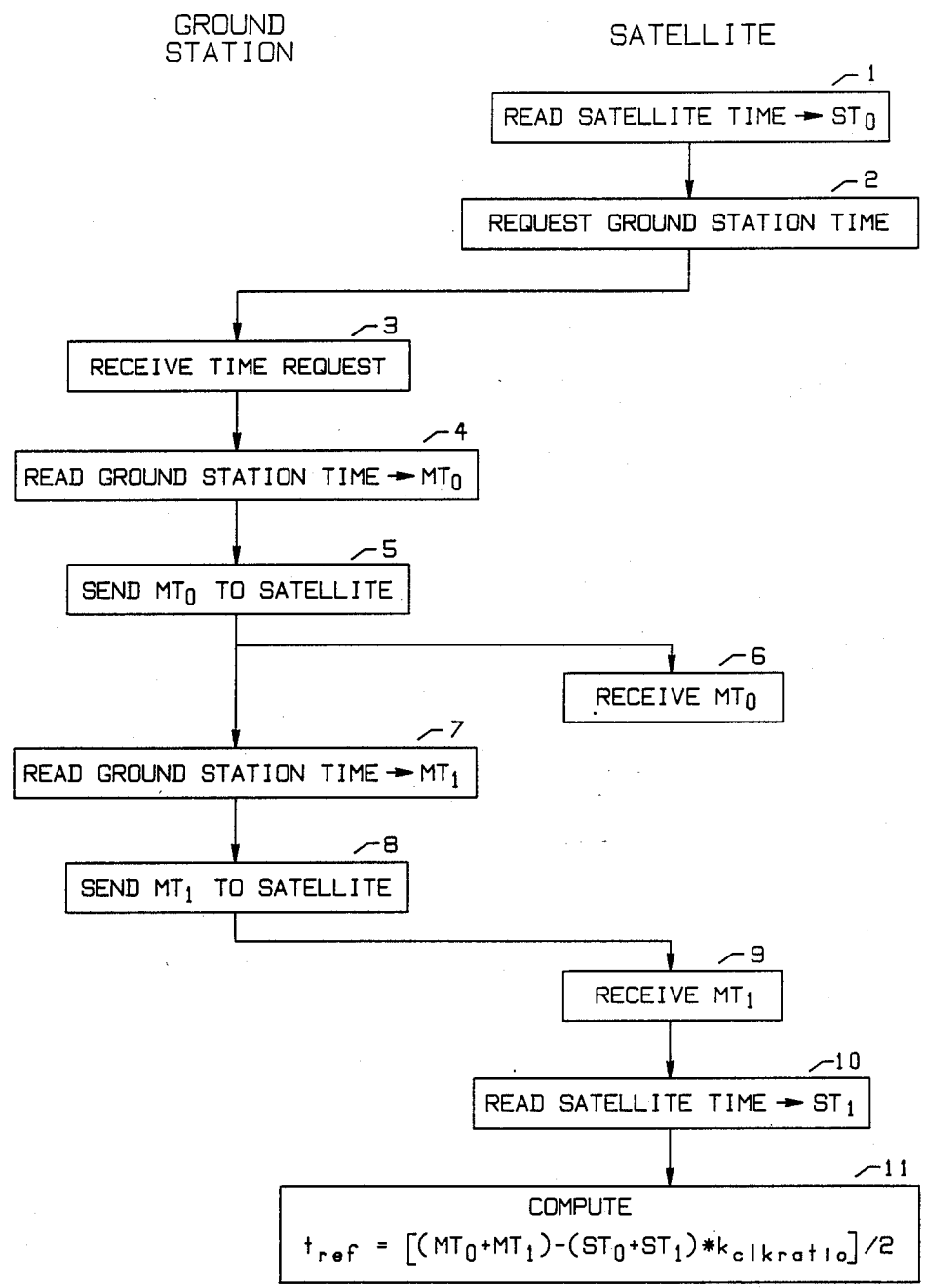
FIG. 8 is a flow chart showing the signal processing steps which take place at said one satellite station and at the ground station for the determination of a reference time ($t_{ref}$) at the satellite station which corresponds to the reference time of the satellite clock as compared to the master clock at the ground station.
Figure 9:
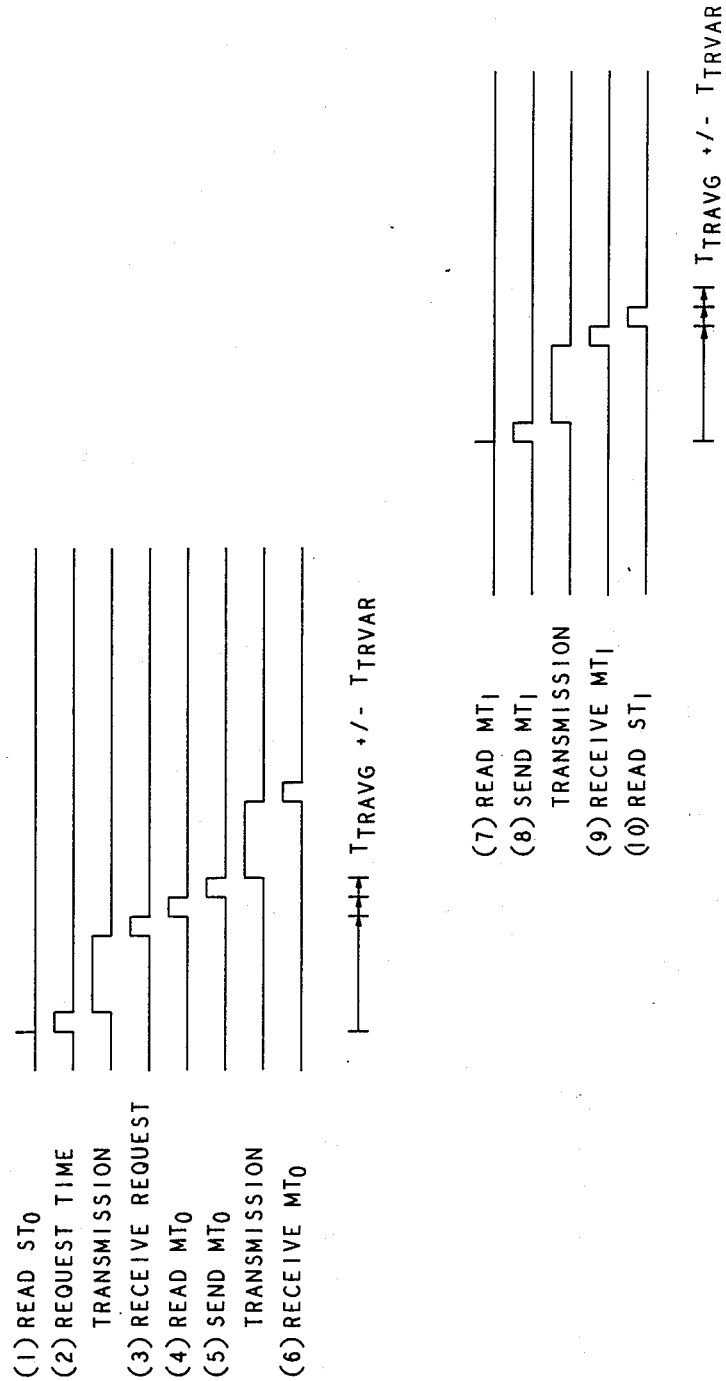
FIG. 9 is a timing diagram for the determination of the reference time $t_{ref}$ at said one satellite station.

As seen in FIG. 8, at time $ST_0$ the satellite records the time on its (slave) clock (Step 1). The satellite then sends a message to the ground station (Step 2) requesting the ground station to read and return the value on its (master) clock. The ground station receives the message (Step 3), reads the time $MT_0$ on its (master) clock (Step 4), and sends this time to the satellite (Step 5). The satellite receives the time and records it as $MT_0$ (Step 6).

The ground station reads the time $MT_1$ on its (master) clock (Step 7), and sends this time to the satellite (Step 8). The satellite receives the time and records it as $MT_1$ (Step 9). The satellite then reads its (slave) clock and records the time the message was received (Step 10) as $ST_1$.

The satellite now has four pieces of information, viz. $ST_0$, $MT_0$, $ST_1$, and $MT_1$. Substituting the variables $ST_0$, $MT_0$, $ST_1$ and $MT_1$ into Equations (7) and (8) yields:

$$MT_0 - T_{TR} = t_{ref} + ST_0 * k_{clkratio} \tag{17}$$

$$MT_1 = t_{ref} + ST_1 * k_{clkratio} - T_{TR} \tag{18}$$

Adding Equations (17) and (18) gives:

$$MT_0 + MT_1 - T_{TR} = t_{ref} + ST_0 * k_{clkratio} + t_{ref} + ST_1 * k_{clkratio} - T_{TR} \tag{19}$$

which reduces to:

$$t_{ref} = [(MT_0 + MT_1) - (ST_0 + ST_1) * k_{clkratio}]/2 \tag{20}$$

Thus $t_{ref}$ can be computed from a set of message exchanges between the ground station 1 and the satellite (FIG. 8, Step 11).

Subtracting Equation (18) from Equation (17) gives:

$$(MT_0 - MT_1) = (ST_0 - ST_1) * k_{clkratio} + t_{ref} - t_{ref} + T_{TR} + T_{TR} \tag{21}$$

which reduces to $$T_{TR} = [(MT_0 - MT_1) + (ST_1 - ST_0) * k_{clkratio}]/2 \tag{22}$$

Thus the transmission time $T_{TR}$ can also be computed from a set of message exchanges between the ground station and the satellite.

Such a set of exchanges also provides an alternate method of computing the value of $k_{clkratio}$. That is, solving Equation (22) for $k_{clkratio}$ yield:

$$k_{clkratio} = \frac{(MT_1 - MT_0)}{(ST_1 - ST_0)} +/- \frac{2 * T_{TR}}{(ST_1 - ST_0)} \tag{23}$$

Although the error term of Equation (23) [$\pm 2 * T_{TR}/(ST_1 - ST_0)$] is larger than the error term of Equation (13) [$+2 * T_{TRvar}/(ST_1 - ST_0)$], both approach zero as the time interval approaches infinity.

In order to increase the accuracy of the above calculations, the slave clock may transmit a number of master clock read messages to the master clock, each message causing the master clock to read and accumulate the value of the master clock output at the time $MT_A$ that the corresponding message is received. At the same time, the slave clock reads and accumulates the value of its output at the time $ST_A$ that each corresponding master clock read message is transmitted.

The master clock transmits a number of slave clock read messages to the slave clock, each such message causing the slave clock to read and accumulate the value of the slave clock output at the time $ST_B$ that the corresponding message is received. At the same time, the master clock reads and accumulates the value of its output at the time $MT_B$ that each corresponding slave clock read message is transmitted. The number $n_b$ of such messages need not necessarily be equal to the number $n_a$ of master clock read messages transmitted by the slave clock to the master clock.

[In the following equations the multiplication symbol * has been omitted before summation symbols for purposes of clarity].

Summing Equation (8) over $n_a$ transmissions yields $$\Sigma MT_A - \Sigma T_{TRA} = K \Sigma ST_A + t_{ref} \tag{24}$$

where $\Sigma MT_A$ is the sum of the master clock times of reception of the $n_a$ master clock read messages transmitted by the slave clock to the master clock $\Sigma T_{TRA}$ is the sum of the transmission times of the $n_a$ master clock read messages K is the ratio $k_{clkratio}$ of the master clock frequency to the slave clock frequency $\Sigma ST_A$ is the sum of the slave clock times of transmission of the $n_a$ master clock read messages $\Sigma t_{ref}$ is the sum of $n_a$ corresponding values of $t_{ref}$.

Since $t_{ref}$ is a constant, $$\Sigma t_{ref} = n_a * t_{ref} \tag{25}$$

Substituting Equation (25) into Equation (24):

$$\Sigma MT_A - \Sigma T_{TRA} = K \Sigma ST_A + n_a * t_{ref} \tag{26}$$

Dividing Equation (26) by $n_a$ yields:

$$\frac{\Sigma MT_A}{n_a} - \frac{\Sigma T_{TRA}}{n_a} = \frac{K \Sigma ST_A}{n_a} + t_{ref} \tag{27}$$

Substituting $T_{TRA}$ for $\Sigma T_{TRA}/n_a$ in Equation (27):

$$\frac{\Sigma MT_A}{n_a} - T_{TRA} = \frac{K \Sigma ST_A}{n_a} + t_{ref} \tag{28}$$

Performing a similar derivation on Equation (7) over $n_b$ transmission yields:

$$\frac{\Sigma MT_B}{n_b} = \frac{K \Sigma ST_B}{n_b} + t_{ref} - T_{TRB} \tag{29}$$

Adding Equations (28) and (29):

$$\frac{\Sigma MT_A}{n_a} + \frac{\Sigma MT_B}{n_b} = K\left(\frac{\Sigma ST_A}{n_a} + \frac{\Sigma ST_B}{n_b}\right) + t_{ref} + t_{ref} + T_{TRA} - T_{TRB} \tag{30}$$

$$2 * t_{ref} = \frac{n_b \Sigma MT_A + n_a \Sigma MT_B}{n_a n_b} - K\left(\frac{n_b \Sigma ST_A + n_a \Sigma ST_B}{n_a n_b}\right) - T_{TRA} + T_{TRB} \tag{31}$$

$$t_{ref} = \frac{(n_b \Sigma MT_A + n_a \Sigma MT_B) - K(n_b \Sigma ST_A + n_a \Sigma ST_B)}{2 n_a n_b} - \frac{T_{TRA} + T_{TRB}}{2} \tag{32}$$

Expanding $T_{TRA}$ and $T_{TRB}$ with Equation 6:

$$-T_{TRA} + T_{TRB} = -\frac{\Sigma T_{TRavga}}{n_a} \pm \frac{\Sigma T_{TRvara}}{n_a} + \frac{\Sigma T_{TRavgb}}{n_b} \pm \frac{\Sigma T_{TRvarb}}{n_b} \quad (33)$$

wherein $\Sigma T_{TRavgn}/n$ is the average transmission time over n trials.

If the average transmission time from the master clock to the slave clock is assumed to be equal to the average transmission time from the slave clock to the master clock, then:

$$\frac{\Sigma T_{TRavga}}{n_a} = \frac{\Sigma T_{TRavgb}}{n_b} \quad (34)$$

wherein $\Sigma T_{TRvarn}/n$ is the average of n observations of the variation ($T_{TRvar}$) of the transmission time. If $T_{TRvar}$ is statistically distributed about 0 then:

$$\lim_{n \to \infty} \frac{\Sigma T_{TRvarn}}{n} = 0 \quad (35)$$

Thus $T_{TRA} = T_{TRB}$ and Equation (32) reduces to:

$$t_{ref} = [(n_b \Sigma MT_A + n_a \Sigma MT_B) - K(n_b \Sigma ST_A + n_a \Sigma ST_B)]/2n_a n_b \quad (36)$$

Let $WS_m = n_b \Sigma MT_A + n_a \Sigma MT_B \quad (37)$ $WS_s = n_b \Sigma ST_A + n_a \Sigma ST_B \quad (38)$ where $WS_m$ and $WS_s$ represent weighted sums of the transmission and reception times being accumulated by the master and slave clocks respectively.

After a desired number $n_a$ of transmissions of master clock read messages and a desired number $n_b$ of transmissions of slave clock read messages, the master clock sends the slave clock the accumulated value $WS_m$. The slave clock then computes the value of $t_{ref}$ as follows:

$$t_{ref} = (WS_m - K^* WS_s)/2n_a n_b \quad (39)$$

thus producing a more accurate estimate of $t_{ref}$ than can be obtained from a single set of exchanges, by reducing errors due to transmission time variations.

Subtracting Equation (29) from Equation (28) yields:

$$\frac{\Sigma MT_A}{n_a} - \frac{\Sigma MT_B}{n_b} = K\left(\frac{\Sigma ST_A}{n_a} - \frac{\Sigma ST_B}{n_b}\right) + t_{ref} - t_{ref} + T_{TRA} + T_{TRB} \quad (40)$$

which reduces to $$T_{TRA} + T_{TRB} = [(n_b \Sigma MT_A - n_a \Sigma MT_B) + K(n_a \Sigma ST_B - n_b \Sigma ST_A)]/n_a n_b \quad (41)$$

From the previous analysis of $T_{TRA}$ and $T_{TRB}$, $$T_{TRA} + T_{TRB} = 2^* T_{TRavg} \quad (42)$$

Therefore the complete formula for $T_{TR}$ is $$T_{TR} = [(n_b \Sigma MT_A - n_a \Sigma MT_B) + K(n_a \Sigma ST_B - n_b \Sigma ST_A)]/2n_a n_b \quad (43)$$

Let $WD_m = n_b \Sigma MT_A - n_a \Sigma MT_B \quad (44)$ $WD_s = n_a \Sigma ST_B - n_b \Sigma ST_A \quad (45)$ Where $WD_m$ and $WS_s$ are weighted differences of the transmission and reception times being accumulated by the master and slave clocks. After a desired number $n_a$ of transmissions of master clock read messages and a desired number $n_b$ of transmissions of slave clock read messages, the master clock sends the slave clock the accumulated value $WD_m$. The slave clock then computes the value of $T_{TR}$ as follows:

$$T_{TR} = (WD_m + K^* WD_s)/2n_a n_b \quad (46)$$

Operation of Radar System

Figure 10:
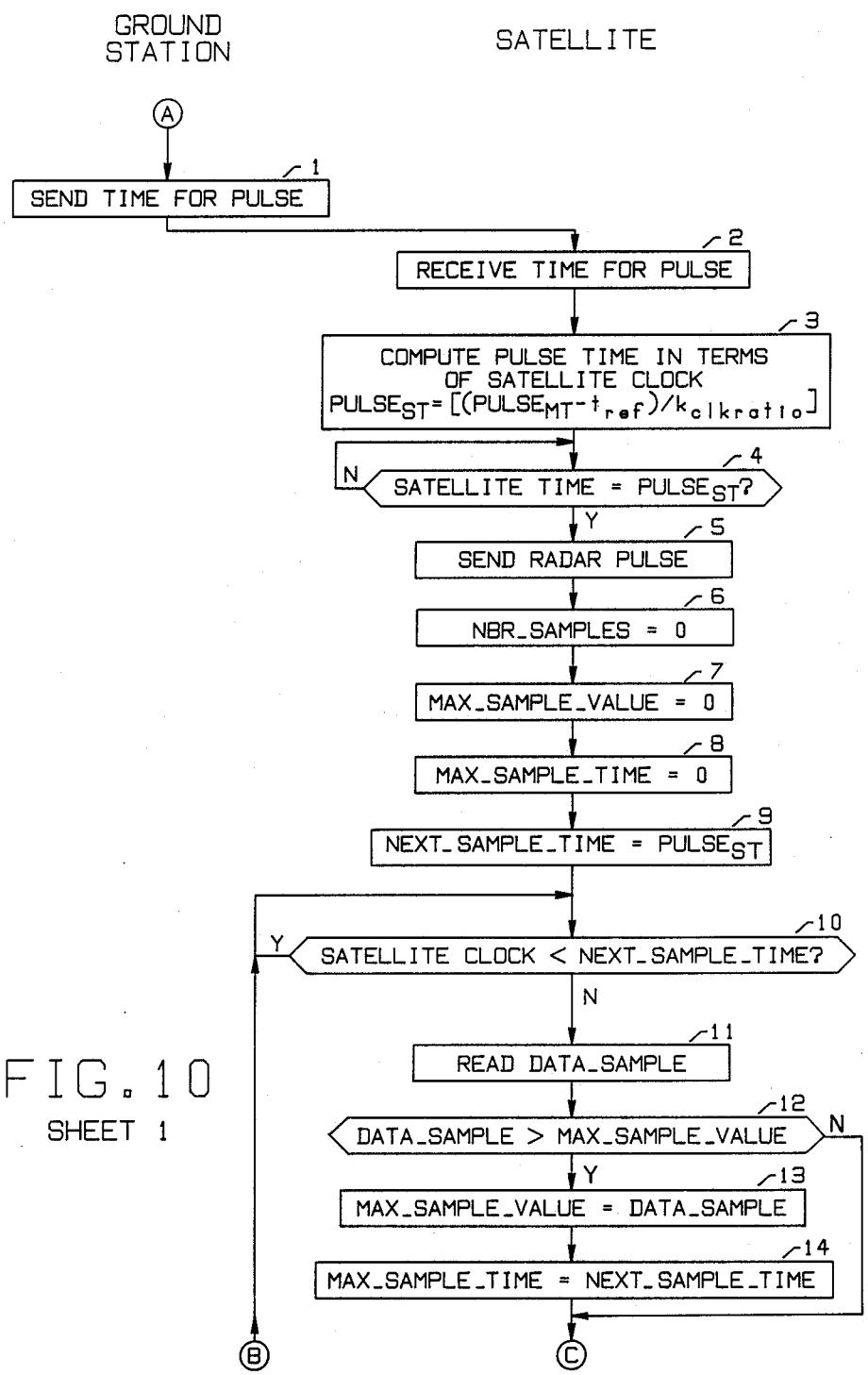
FIG. 10, sheets 1 and 2, is a flow chart showing the data acquisition, data processing and time resolution steps involved in the coordinated processing of radar signals from an object by each of the satellite stations.
Figure 10:
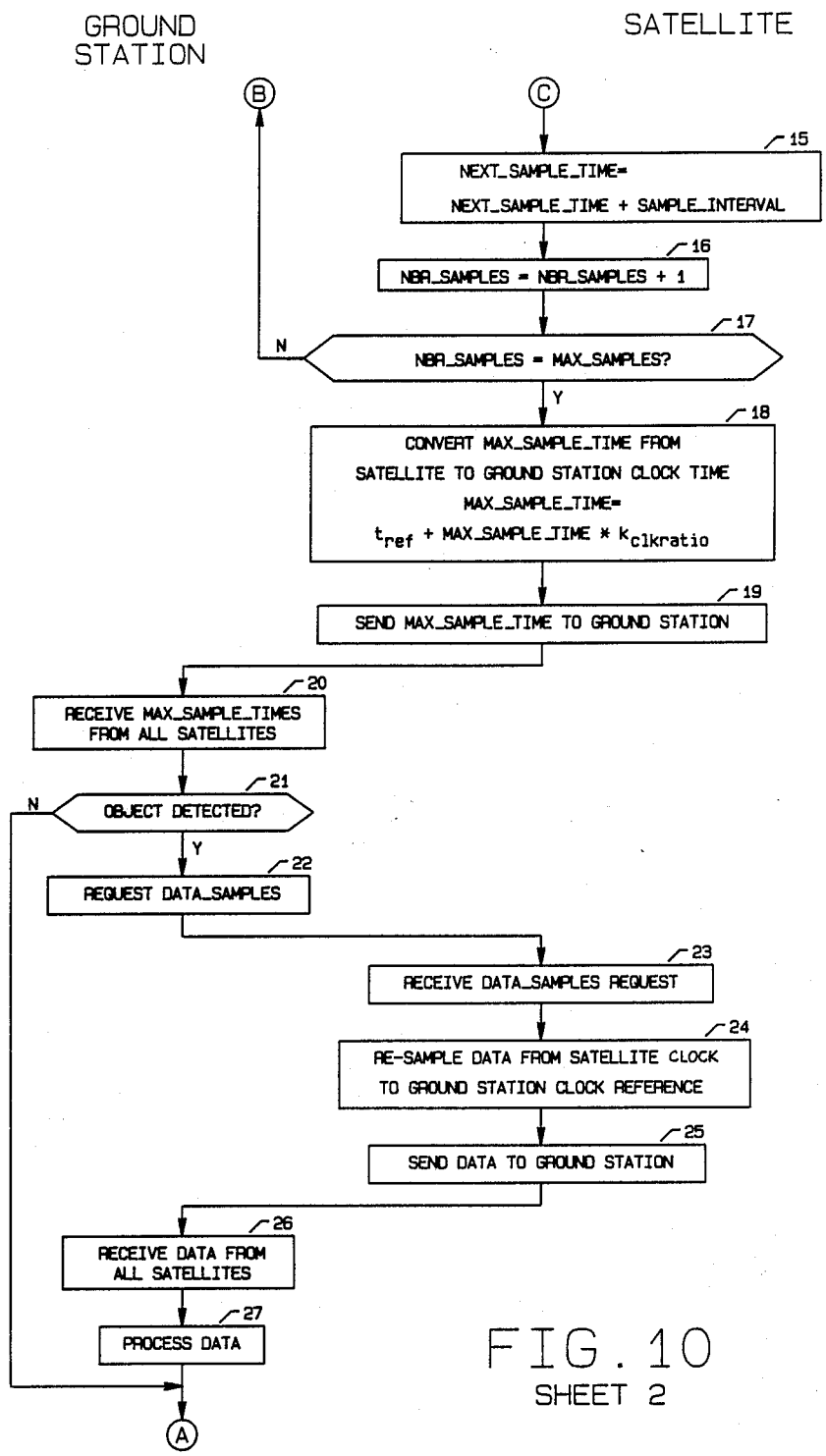

As seen in FIG. 10, the ground station 1 sends a message to each of the satellites 3a, 3b, 3c requesting the emission of a radar pulse (Step 1) after a specified delay (the delay being different for different satellites, so that their emissions are coordinated in manner desired by the ground station; and specifying the duration of each of the time intervals thereafter at which samples of radar return signals are to be taken.

Each satellite receives the command (Step 2) and waits until the specified radar pulse emission time (adjusted to slave clock time units (Step 3)) (Step 4). When the specified emission time is reached, a pulse is emitted by each of the radar dishes 4a, 4b and 4c (Step 5). Each satellite then initializes a number of data collection variables (Steps 6, 7, 8). To begin sampling the data immediately, the satellite sets the first sampling time to the time the pulse was emitted (Step 9).

Each satellite then waits until its clock reaches the first specified sampling time, i.e. at the expiration of the previously specified interval time at which samples are to be taken (Step 10). When the sampling time is reached, the satellite reads a data sample from its radar dish 4a, 4b or 4c via the A/D converter 17 (Step 11).

The satellite repeats this process, comparing each data sample to the previously stored (maximum) data sample (Step 12). If the new sample is greater than the previously stored maximum, the satellite updates the recorded maximum value (Step 13) and the time of arrival of the new maximum value (Step 14). The satellite then computes the time of arrival of the next data sample (Step 15), increments the number of data samples collected (Step 16), and tests if all the desired samples have been collected (Step 17).

After all the data has been collected, the satellite converts the time at which the maximum or highest amplitude radar return was received from satellite (slave) clock time to ground station (master) clock time (Step 18). The maximum amplitude radar signal receipt time is then sent to the ground station (Step 19). The ground station receives the maximum amplitude radar signal receipt time for each satellite (Step 20), compares the samples from all satellites, and decides if a significant event was detected (Step 21).

If no event was detected, the process repeats when the ground station 1 requests another radar pulse to be emitted (Step 1).

If an event was detected, the ground station requests that the satellites transmit their data streams to the ground station for analysis (Step 22). Each satellite receives the request (Step 23), converts its data from satellite (slave) clock sampled data streams to ground (master) clock sampled data streams via a re-sampling algorithm hereafter described (Step 24). The re-sampled data is then sent to the ground station (Step 25), where it is received (Step 26), and processed (Step 27).

Figure 11:
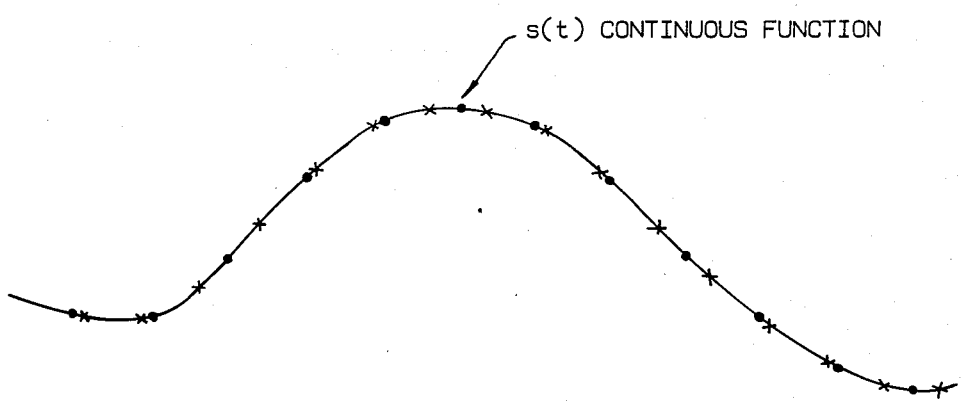
FIG. 11 is a diagram of the received radar signal amplitude vs. time data obtained via the ground station and one satellite system clock shown in FIG. 3.

The total process repeats when the ground station sends the satellites a request for another radar pulse to be emitted Re-Sampling Algorithm Each satellite collects a sampled data set s[ST] via its clock which it must transform to s[MT], which is the same input data coordinated to the (master) clock of the ground station. The timing of s[ST] and s[MT] are shown in FIG. 11.

The sample variables ST and MT can differ in both frequency and reference value, the parameters for which the method of the invention corrects. The transformation from s[ST] to s[MT] is a two step process, involving interpolation and resampling.

For band-limited data (a fundamental assumption in sampled-data systems) the interpolation function (Equation 47) allows the determination of the value of a continuous function s(t) for any value of t (time) from a discrete set of samples s[ST].

$$s(t) = \sum_{ST=-\infty}^{\infty} s(ST * T_{ST}) * \frac{\sin((\pi/T_{ST})(t - ST * T_{ST}))}{((\pi/T_{ST})(t - ST * T_{ST}))} \quad (47)$$

where  ST  = Sample number
       $T_{ST}$ = Sample clock period where
ST = Sample number
$T_{ST}$ = Sample clock period Thus the individual satellites can reconstruct (interpolate) their sampled data to generate the continuous signal s(t).

The second and final step in the re-sampling process is to re-sample the interpolated continuous signal s(t) at points representing sampling done by the virtual (master) clock, i.e. at the sampling times originally desired by the ground station command to the satellites.

Referring to FIG. 11, the satellite is sampling the data at time intervals $T_{ST}$. The desired sampling times $T_{MT}$ are converted to slave clock times via the inverse of Equation (5), namely:

$$T_{ST} = (T_{MT} - t_{ref})/k_{clkratio} \quad (48)$$

Substituting Equation 48 into Equation 47 yields Equation 49, the complete formula for transforming s[ST] to s[MT].

$$s(MT) = \sum_{ST=-\infty}^{\infty} s(ST * T_{ST}) * \frac{\sin((\pi/T_{ST})(((t_{MT} - t_{ref})/k_{clkratio} - ST*T_{ST}))}{((\pi/T_{ST})(((t_{MT} - t_{ref})/k_{clkratio} - ST*T_{ST}))} \quad (49)$$

Determination of a Global Time Reference

In some systems it may be desirable to determine the virtual (master) clock reference from the average of the reference times of all clocks in the system; and to establish the virtual (master) clock frequency as the average of the frequencies of all clocks in the system. For the previous example, assume the ground station utilizes the same correction equation as the satellites, but starts with $k_{clkratio}=1$ and $t_{ref}=0$.

Figure 12:
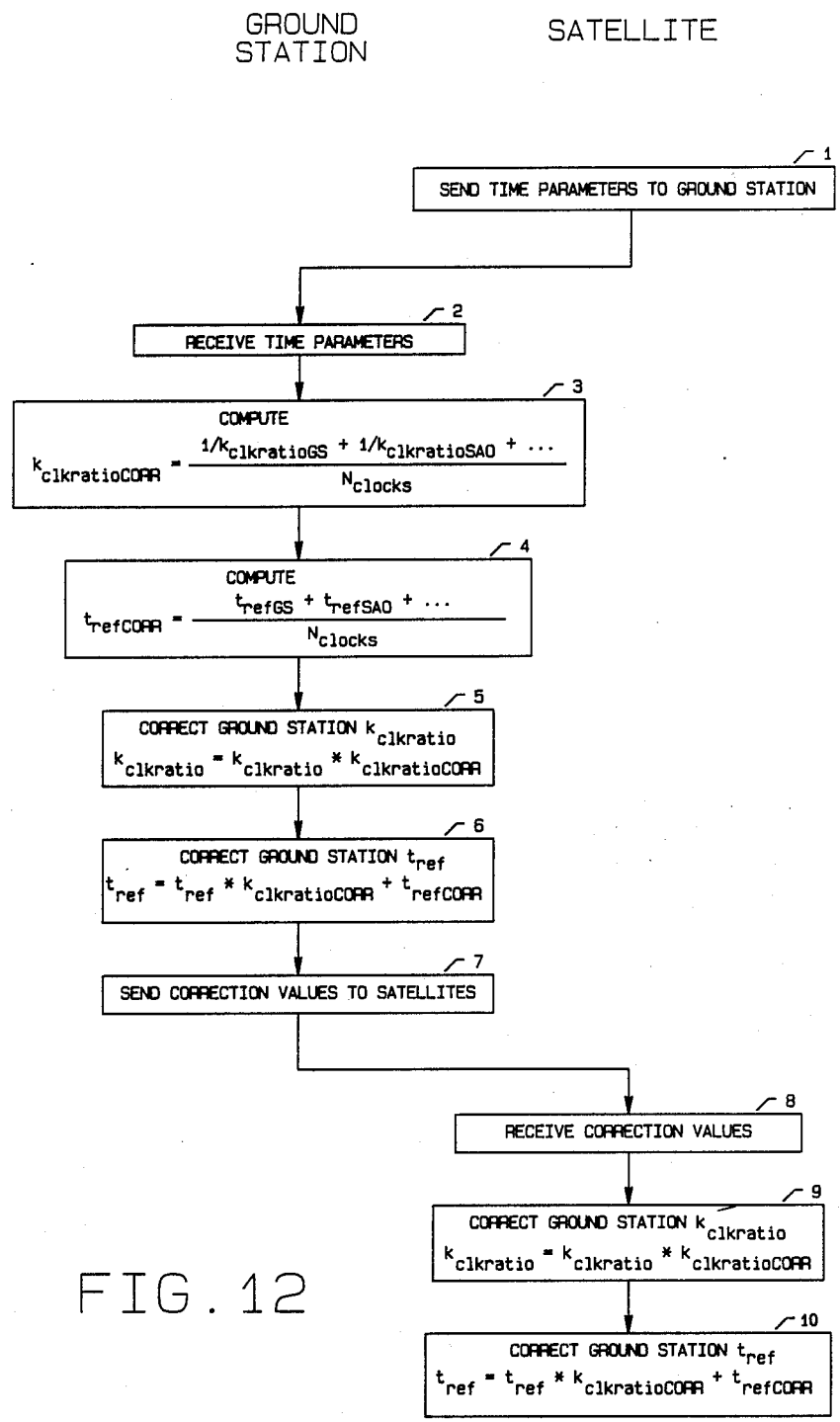
FIG. 12 is a flow chart showing signal processing in each satellite station and the ground station, to provide an optional feature of the invention wherein the master clock at the ground station determines a frequency corresponding to the average of the frequencies of the various clocks in the system and a reference time which corresponds to the average of the reference times of the various clocks.

After the satellites have determined their parameters relative to the ground station, an average of the parameters can be computed and used to determine the new virtual (master) clock parameters, utilizing the method depicted in FIG. 12.

The satellites send their parameters $t_{ref}$ and $k_{clkratio}$ to the ground station (Step 1).

The ground station receives the time parameters (Step 2) and computes the correction factor (Step 3) for $k_{clkratio}$ such that the virtual clock frequency will be the average of all the clock frequencies in the system, utilizing Equation 50.

$$k_{clkratioCORR} = \frac{1/k_{clkratioGS} + 1/k_{clkratioSA0} + \cdots}{N_{clocks}} \quad (50)$$

The ground station then computes the correction factor (Step 4) for $t_{ref}$ such that the virtual (master) clock reference time will be the average of the reference times of all clocks in the system, utilizing Equation 51.

$$t_{refCORR} = \frac{t_{refGS} + t_{refSA0} + \cdots}{N_{clocks}} \quad (51)$$

The ground station then corrects its clock frequency parameter by applying the average values of $k_{clkratio}$ (Step 5/Equation 52); and corrects its reference time parameter by applying the average of the reference times (Step 6/Equation 53).

$$k_{clkratio} = k_{clkratio} * k_{clkratioCORR} \quad (52)$$

$$t_{ref} = t_{ref} * k_{clkratioCORR} + t_{refCORR} \quad (53)$$

As previously described, the ground station then transmits the time parameter correction values to each of the satellites (Step 7). These signals are received by the satellites (Step 8) and the frequency and reference time parameters of the satellite (slave) clocks are corrected (Steps 9, 10).

Non-Linear Modelling

The model of time utilized in the method described in this application makes a number of assumptions which are normally true, including: a linear relationship between the variables, a stable oscillator driving the clocks, and an average transmission time $T_{TRave}$ which has the same value regardless of the direction of transmission between the master and slave clocks.

The assumptions may not be sufficiently accurate in some applications where special conditions exist and an extremely high degree of precision is required. In order to adjust for such conditions, the satellites can plot the data used in the time correction algorithm and search for patterns. If patterns are found, e.g. predictable long term fluctuations in the oscillator frequency, they can be corrected for by a more sophisticated model of time using known curve fitting techniques. Similarly, the system can use information about the clocks, their operation and their interrelationship in the derivation of the time parameters.

Cascading of Slave Clocks

It is not necessary for a particular slave clock to communicate directly with the master clock in order to enable that slave clock to be referenced to the master clock. Rather, an auxiliary slave clock can communicate with an intermediate slave clock which in turn communicates with the master clock.

When this indirect or cascaded arrangement is employed, a primary clock ratio of the frequency of the master clock to the frequency of the intermediate slave clock is determined as previously described; and a primary reference time equal to the difference between the master and intermediate slave clocks is also determined as previously described.

Similarly, with the intermediate slave clock acting as a "master" clock and the auxiliary slave clock acting as a "conventional" slave clock, a secondary clock ratio of the frequency of the intermediate slave clock to the frequency of the auxiliary slave clock is determined as previously described; and a secondary reference time equal to the difference between the intermediate and auxiliary slave clocks is also determined as previously described.

The auxiliary slave clock then is referenced to the master clock utilizing a composite reference time and clock ratio instead of conventional reference time and clock ratio values. The composite reference time is equal to the sum of the primary reference time and the secondary time multiplied by the primary clock ratio, and the composite clock ratio is equal to the product of the primary and secondary clock ratios.

For example, if the master clock is running at a frequency of 1.00 MHz., the intermediate slave clock is running at 2.00 MHz. and the auxiliary slave clock is running at 6.00 MHz., the primary clock ratio would be 0.5 and the secondary clock ratio would be 0.333, for a composite clock ratio of 0.16666; and this clock ratio would be used in the manner previously described in this application, to reference the auxiliary slave clock to the master clock, just as though the auxiliary clock were a "conventional" slave clock.

Similarly, if the master clock - intermediate slave clock primary reference time is 1.00 and the intermediate slave clock - auxiliary slave clock secondary reference time is 2.00, the composite reference time would be 2.00, i.e. 2.00*0.5+1.00 and this reference time value would be used in the manner previously described in this application, to reference the auxiliary slave clock to the master clock, just as though the auxiliary clock were a "conventional" slave clock.

Other Variations

While the invention has been described in terms of specific embodiments, it is evident that there are numerous variations which are within the scope of the present invention.

For example, while the embodiments have been described in terms of referencing one or more slave clocks to a master clock, the reciprocal arrangement is inherent in the present invention.

That is, the master clock can be referenced to any slave clock using the same techniques that have already been described. That is, the value of the slave clock time signal of a particular slave clock corresponding to a given master clock time value MT can be determined according to the relation $$n_{pc} = (MT - t_{ref})/k_{clkratio} \quad (54)$$

where $n_{pc}$ is the number of increments of the slave clock time signal.

Another variation is the use of the reference time at a point other than the starting time of the slave clock being referenced. As previously discussed, the reference time $t_{ref}$ is the difference between the time values of the master and slave clocks at a particular moment. The previously presented equations involving reference time are based upon that moment being the starting time of the slave clock, i.e. when the time value of the slave clock is zero; and as previously described for many applications it is preferred that the determination of $t_{ref}$ correspond to this moment.

It should be kept in mind, however, that while the value of $t_{ref}$ corresponds to the difference between the master and slave clock time signal values at a particular slave clock (or master clock) time (here the slave clock starting time), the communications and calculations required to determine this value of $t_{ref}$ may be performed at any desired time.

However, it is not necessary that $t_{ref}$ be determined as the difference between the master and slave clock time signal values at the starting time of the slave clock. The reference time $t_{ref}$ can be determined as said difference at any slave clock time, so long as the slave clock time increments are adjusted for any difference between the master and slave clock frequencies on the basis of the number of slave clock time signal increments between the slave clock time signal and the slave clock time signal value corresponding to the time of determination of the reference time.

That is, if the reference time is determined to correspond to the difference between the master and slave clock time signal values when the slave clock has generated $n_{pc0}$ time signal increments from its starting time, then the master or virtual clock time $T_{vc}$ when the slave clock has generated a total of $n_{pc}$ time signal increments from its starting time is given by $$T_{vc} = t_{ref} + n_{pc0} + (n_{pc} - n_{pc0}) * k_{clkratio} \quad (55)$$

In the particular case where the reference time is determined to correspond to the difference between the master and slave clock time signal values at the starting time of the slave clock, $n_{pc0} = 0$ and Equation (55) reduces to Equation (5).

We claim:

1. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a second time signal having the value $MT_0$;

(4) subsequently transmitting from said master clock to said slave clock a third time signal having a value $MT_1$ corresponding to the value of said master clock time signal when said third time signal is transmitted;

(5) determining a value $ST_1$ of said slave clock time signal when said third time signal is received by said slave clock;

(6) upon receipt of said second and third time signals at said slave clock, determining a virtual clock reference time $t_{ref}$ given by $$t_{ref}=[(MT_0+MT_1)-(ST_0+ST_1)]/2;\text{ and}$$

(7) at said slave clock, calculating a virtual clock value $T_{vc}$ given by $$T_{vc}=t_{ref}+n_{pc}$$

where $n_{pc}$ is the number of slave clock time signal increments.

2. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value corresponding to the value of said slave clock time signal when said first time signal is transmitted;

(2) subsequently transmitting from said master clock to said slave clock (i) a second time signal having a value corresponding to the value of said master clock time signal when said first time signal was received by said master clock, and (ii) a third time signal having a value corresponding to the value of said master clock time signal when said third time signal is transmitted; and (3) upon receipt of said second and third time signals at said slave clock, determining the reference time value required to reference the slave clock to the master clock.

3. A method for referencing at least one slave clock to a master clock, said master clock providing a master clock time signal, said slave clock providing a periodically incremented slave clock time signal, said method comprising the steps of:

(1) transmitting a number of first reference time signals from the slave clock to the master clock;

(2) accumulating at the master clock time values corresponding to the times of reception of said first reference time signals as measured by the master clock;

(3) subsequently transmitting a number of second reference time signals from said master clock to said slave clock;

(4) accumulating at the master clock time values corresponding to the times of transmission of said second reference time signals as measured by the master clock;

(5) accumulating at the slave clock time values corresponding to (i) the times of transmission of said first reference time signals as measured by the slave clock, and (ii) the times of reception of said second reference time signals as measured by the slave clock;

(6) transmitting from the master clock to the slave clock a signal having a value corresponding to a weighted sum of the master clock time values accumulated at Steps (2) and (4); and (7) computing the reference time of the slave clock relative to the master clock from said weighted sum and a weighted sum of the slave clock time values accumulated at Step (5).

4. The method according to claim 2 or 3, comprising the steps of:

transmitting from said master clock to said slave clock a time interval commencement signal having a value corresponding to the value of said master clock time signal when said time interval commencement signal is transmitted;

subsequently transmitting from said master clock to said slave clock a time interval termination signal having a value corresponding to the value of said master clock time signal when said time interval termination signal is transmitted; and after receipt of said time interval termination signal at said slave clock, determining the clock ratio of (i) the difference between the values of said time interval termination and time interval commencement signals to (ii) the elapsed time between reception of said time interval commencement and time interval termination signals as determined by said slave clock.

5. The method according to claim 4, comprising the additional steps of determining a value of said master clock time signal by incrementing the value of said slave clock time signal so determined at a rate corresponding to the product of the value of said slave clock time signal with said clock ratio, and adding said reference time value to the incremented value of said slave clock time signal.

6. A method for referencing at least one slave clock to a master clock, said master clock providing a master clock time signal, said slave clock providing a periodically incremented slave clock time signal, said method comprising the steps of:

(1) transmitting from said master clock to said clock a time interval commencement signal having a value corresponding to the value of said master clock time signal when said time interval commencement signal is transmitted;

(2) subsequently transmitting from said master clock to said slave clock a time interval termination signal having a value corresponding to the value of said master clock time signal when said time interval termination signal is transmitted; and (3) after receipt of said time interval termination signal at said slave clock, determining the clock ratio of (i) the difference between the values of said time interval termination and time interval commencement signals to (ii) the elapsed time between reception of said time interval commencement and time interval termination signals as determined by said slave clock.

7. The method according to claim 6, comprising the additional steps of repeating the transmission of said time interval termination signal a number of times, and determining each new corresponding value of said clock ratio utilizing said time interval commencement signal and the most recent time interval termination signal.

8. A method for referencing a plurality of slave clocks to a master clock, said master clock providing a master clock time signal, each slave clock providing a periodically incremented slave clock time signal, said method comprising the steps of:

(1) transmitting from each slave clock to said master clock a first time signal having a value corresponding to the value of said slave clock time signal when said first time signal is transmitted;

(2) subsequently transmitting from said master clock to each slave clock (i) a second time signal having a value corresponding to the value of said master clock time signal when said first time signal was received from the corresponding slave clock by said master clock, and (ii) a third time signal having a value corresponding to the value of said master clock time signal when said third time signal is transmitted to the corresponding slave clock; and (3) upon receipt of the corresponding second and third time signals at each slave clock, determining the reference time of the master clock relative to the corresponding slave clock.

9. The method according to claim 8, comprising the additional step of determining a virtual clock reference time value equal to the average of the reference time values.

10. A method for referencing a plurality of slave clocks to a master clock, said master clock providing a master clock time signal, each slave clock providing a periodically incremented slave clock time signal, said method comprising the steps of:

(1) transmitting from said master clock to each slave clock a time interval commencement signal having a value corresponding to the value of said master clock time signal when said time interval commencement signal is transmitted;

(2) subsequently transmitting from said master clock to each slave clock a time interval termination signal having a value corresponding to the value of said master clock time signal when said time interval termination signal is transmitted; and (3) after receipt of said time interval termination signal at each slave clock, determining the clock ratio of (i) the difference between the values of said time interval termination and time interval commencement signals to (ii) the elapsed time between reception of said time interval commencement and time interval termination signals as determined by the corresponding slave clock.

11. The method according to claim 10, comprising the additional step of determining a virtual clock ratio value equal to the average of the clock ratio values determined at each of said slave clocks.

12. The method according to claim 3, 4, 6, 7, 8, 9 or 10, comprising the additional steps of:

acquiring data from a transducer operatively associated with each slave clock;

sampling said data and storing information as to the value of each sample of data acquired and the time of acquisition thereof as measured by the corresponding slave clock; and processing the stored information utilizing reference time and clock ratio parameters associated with said virtual clock time signal values to provide a series of data sets comprising said data samples together with the times of acquisition thereof as measured by values of time determined by said virtual clock and corresponding to the time values generated by said master clock.

13. The method according to claim 12, wherein said processing step comprises the steps of:

utilizing the stored information to resample said data to provide a second set of data samples together with the time of acquisition thereof as determined by said virtual clock time signal, by interpolating the stored information to generate a function corresponding thereto and having values corresponding to times interposed between the times at which the data was sampled; and sampling said function at intervals corresponding to time values derived from the virtual clock time signal.

14. A method for determining the frequency relationship between at least one slave clock and a master clock, wherein the master clock provides a master clock time signal and the slave clock provides a slave clock time signal, said method comprising the steps of:

transmitting a time interval commencement signal from the master clock to the slave clock, the time interval commencement signal having a value corresponding to the value of the master clock time signal when the time interval commencement signal is transmitted;

subsequently transmitting a time interval termination signal from the master clock to the slave clock, the time interval termination signal having a value corresponding to the value of the master clock time signal when the time interval termination signal is transmitted;

after receipt of the time interval termination signal at the slave clock, determining the clock ratio of the two clock frequencies as the ratio of (i) the difference between the values of the time interval commencement and time interval termination signals to (ii) the elapsed time between reception of the time interval commencement and time interval termination signals as determined by the slave clock.

15. The method according to claim 14, comprising the additional steps of repeating the transmission of said time interval termination signal a number of times, determining at each corresponding termination signal a new value of said clock ratio, and determining the ratio of (i) the difference between the values of the time interval commencement signal and the most recent time interval termination signal to (ii) the elapsed time between reception of the time interval commencement signal and said most recent time interval termination signal.

16. The method according to claim 14 or 15, comprising the additional step of determining said master clock time signal by incrementing the value of said slave clock time signal at a rate corresponding to the product of the value of said slave clock time signal with said clock ratio.

17. A method for establishing a reference time value of at least one slave clock to correspond with a reference time of a master clock, wherein the master clock provides a master clock time signal and the slave clock provides a slave clock time signal, said method comprising the steps of:

transmitting a first reference time signal from the slave clock to the master clock, said first reference time signal having a value corresponding to the value of the slave clock time signal when the first reference time signal is transmitted;

subsequently transmitting a second reference time signal from the master clock to the slave clock, said second reference time signal having a value corresponding to the value of the master clock time signal when the first reference time signal was received by the master clock;

transmitting a third reference time signal from the master clock to the slave clock, said third reference time signal having a value corresponding to the value of the master clock time signal when the third reference time signal is transmitted;

after receipt of the third reference time signal at the slave clock, determining the reference time value by:

adding the value of said slave clock time signal at the time of transmission of said first reference signal, to the value of said slave clock time signal at the time of reception of said third reference signal at said slave clock, to obtain a first subtotal value;

subtracting said first subtotal value from the sum of the values of said second and third reference time signals, to obtain a second subtotal value; and dividing said second subtotal value by two to obtain the reference time value.

18. The method according to claim 17, comprising the additional steps of:

prior to said subtracting step, modifying said first subtotal value by multiplying said first subtotal value by the ratio of the frequency of said master clock to the frequency of said slave clock, to obtain an adjusted first subtotal value; and utilizing said adjusted first subtotal value instead of said first subtotal value in said subtracting step.

19. The method according to claim 17, or 18, comprising the additional steps of:

(1) transmitting a number of said first reference time signals from the slave clock to the master clock;
(2) accumulating at the master clock time values corresponding to the times of reception of said first reference time signals as measured by the master clock;
(3) subsequently transmitting a number of said third reference time signals from said master clock to said slave clock;
(4) accumulating at the master clock time values corresponding to the times of transmission of said third reference time signals as measured by the master clock;
(5) accumulating at the slave clock time values corresponding to (i) the times of transmission of said first reference time signals as measured by the slave clock, and (ii) the times of reception of said third reference time signals as measured by the slave clock;
(6) transmitting from the master clock to the slave clock a signal having a value corresponding to a weighted sum of the master clock time values accumulated at Steps (2) and (4); and
(7) computing the reference time of the slave clock relative to the master clock from said weighted sum and a weighted sum of the slave clock time values accumulated at Step (5).

20. The method according to claim 19, comprising the additional step of determining said master clock time signal by adding said reference time value to the value of said slave clock time signal.

21. The method according to claim 19, comprising the additional steps of determining a value of said master clock time signal by incrementing the value of said slave clock time signal so determined at a rate corresponding to the product of the value of said slave clock time signal and said clock ratio, and adding said reference time value to the incremented value of said slave clock time signal.

22. The method according to claim 17 or 18, comprising the additional step of determining said master clock time signal by adding said reference time value to the value of said slave clock time signal.

23. The method according to claim 14, 15, 17 or 18, comprising the additional steps of determining a value of said master clock time signal by incrementing the value of said slave clock time signal so determined at a rate corresponding to the product of the value of said slave clock time signal and said clock ratio, and adding said reference time value to the incremented value of said slave clock time signal.

24. A method for determining the transmission time of signals exchanged between a slave clock and a master clock, wherein the master clock provides a master clock time signal and the slave clock provides a slave clock time signal, said method comprising the steps of:

transmitting a first reference time signal from the slave clock to the master clock, said first reference time signal having a value corresponding to the value of the slave clock time signal when the first reference time signal is transmitted;

subsequently transmitting a second reference time signal from the master clock to the slave clock, said second reference time signal having a value corresponding to the value of the master clock time signal when the first reference time signal was received by the master clock;

transmitting a third reference time signal from the master clock to the slave clock, said third reference time signal having a value corresponding to the value of the master clock time signal when the third reference time signal is transmitted;

after receipt of the third reference time signal at the slave clock, determining the value of the time required for transmission of a signal between the master and slave clocks by:

subtracting the value of said third reference time signal from the value of said second reference time signal, to obtain a first subtotal value;

subtracting the value of said slave clock time signal at the time of transmission of said first reference time signal from the value of said slave clock time signal at the time of reception of said third reference time signal at said slave clock, to obtain a second subtotal value; and adding said first subtotal value to said second subtotal value to obtain a summation value, and dividing the summation value by two to obtain the transmission time value.

25. The method according to claim 24, comprising the additional steps of:

prior to said adding step, modifying said second subtotal value by multiplying said second subtotal value by the ratio of the frequency of said master clock to the frequency of said slave clock, to obtain an adjusted second subtotal value; and utilizing said adjusted second subtotal value instead of said second subtotal value in said adding step.

26. The method according to claim 24 or 25, comprising the additional steps of:

(1) transmitting a number of said first reference time signals from the slave clock to the master clock;
(2) accumulating at the master clock time values corresponding to the times of reception of said first reference time signals as measured by the master clock;

(3) subsequently transmitting a number of said third reference time signals from said master clock to said slave clock;

(4) accumulating at the master clock time values corresponding to the times of transmission of said third reference time signals as measured by the master clock;

(5) accumulating at the slave clock time values corresponding to (i) the times of transmission of said first reference time signals as measured by the slave clock, and (ii) the times of reception of said third reference time signals as measured by the slave clock;

(6) transmitting from the master clock to the slave clock a signal having a value corresponding to a weighted difference of the master clock time values accumulated at Steps (2) and (4); and (7) computing the transmission time of the slave clock relative to the master clock from said weighted difference and a weighted difference of the slave clock time values accumulated at Step (5).

27. A method for referencing at least one slave clock to a master clock, said master clock providing a master clock time signal, said slave clock providing a periodically incremented slave clock time signal, said method comprising the steps of:

(1) transmitting from said slave clock to said master clock a time interval commencement signal having a value $ST_0$ corresponding to the value of said slave clock time signal when said time interval commencement signal is transmitted;

(2) determining a value $MT_0$ of said master clock time signal when said time interval commencement signal is received by said master clock;

(3) subsequently transmitting from said master clock to said slave clock a time signal having the value $MT_0$;

(4) transmitting from said slave clock to said master clock a time interval termination signal having a value $ST_1$ corresponding to the value of said slave clock time signal when said time interval termination signal is transmitted;

(5) determining a value $MT_1$ of said master clock time signal when said time interval termination signal is received at said master clock;

(6) subsequently transmitting from said master clock to said slave clock a time signal having the value $MT_1$; and (7) upon receipt of said time interval termination signal at said slave clock, determining a ratio $k_{clkratio}$ of the frequency of the master clock to the frequency of the slave clock by means of the equation $$k_{clkratio} = (MT_1 - MT_0)/(ST_1 - ST_0).$$

28. A method for referencing at least one slave clock to a master clock, said master clock providing a master clock time signal, said slave clock providing a periodically incremented slave clock time signal, said method comprising the steps of:

(1) transmitting from said master clock to said slave clock a time interval commencement signal having a value $MT_0$ corresponding to the value of said master clock time signal when said time interval commencement signal is transmitted;

(2) determining a value $ST_0$ of said slave clock time signal when said time interval commencement signal is received by said slave clock;

(3) transmitting from said master clock to said slave clock a time interval termination signal having a value $MT_1$ corresponding to the value of said master clock time signal when said time interval termination signal is transmitted;

(4) determining a value $ST_1$ of said slave clock time signal when said time interval termination signal is received by said slave clock; and (5) upon receipt of said time interval termination signal at said slave clock, determining a ratio $k_{clkratio}$ of the frequency of the master clock to the frequency of the slave clock by means of the equation $$k_{clkratio} = (MT_1 - MT_0)/(ST_1 - ST_0).$$

29. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining the value $MT_0$ of said master clock time signal when said first time signal is received by said master clock;

(3) subsequently transmitting from said master clock to said slave clock a second time signal having the value $MT_0$;

(4) subsequently transmitting from said master clock to said slave clock a third time signal having a value $MT_1$ corresponding to the value of said master clock time signal when said third time signal is transmitted;

(5) determining the value $ST_1$ of said slave clock time signal when said third time signal is received by said slave clock;

(6) upon receipt of said third time signal at said slave clock, determining a virtual clock reference time $t_{ref}$ which is adjusted for any difference between the frequencies of the master and slave clocks, according to the equation $$t_{ref} = [(MT_0 + MT_1) - (ST_0 + ST_1) * k_{clkratio}]/2;$$

where $k_{clkratio}$ is the ratio of the frequency of said master clock to the frequency of said slave clock; and (7) at said slave clock, calculating a virtual clock time value $T_{vc}$ given by $$T_{vc} = t_{ref} + n_{pc} * k_{clkratio}$$

where $n_{pc}$ is the number of periodic slave clock time increment signals generated.

30. The method according to claim 29, comprising the additional steps of:

acquiring time dependent data comprising a multiplicity of data samples having values dependent upon the time of acquisition thereof;

storing said time dependent data in a plurality of data sets, each data set including at least one data sample and the value of said slave clock time signal at the time the corresponding data sample was acquired; and modifying each said data set by the replacing the value of the slave clock time signal therein with the corresponding value of the virtual clock time signal.

31. The method according to claim 29, comprising the additional steps of:

acquiring time dependent data comprising a multiplicity of data samples having values dependent upon the time of acquisition thereof;

storing said time dependent data in a plurality of data sets, each data set including at least one data sample and the value of said slave clock time signal at the time the corresponding data sample was acquired; and modifying each said data set by replacing the value of the data sample therein with a value thereof corresponding to the time defined by a selected value of the virtual clock time signal.

32. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a second time signal having the value $MT_0$;

(4) subsequently transmitting from said master clock to said slave clock a third time signal having a value $MT_1$ corresponding to the value of said master clock time signal when said third time signal is transmitted;

(5) determining a value $ST_1$ of said slave clock time signal when said third time signal is received by said slave clock; and (6) upon receipt of said third time signal at said slave clock, determining a transmission time $T_{TR}$ given by $$T_{TR} = [(MT_0 - MT_1) + (ST_1 - ST_0)]/2$$

33. The method according to claim 32, wherein the calculation of transmission time is adjusted for any difference between the frequencies of the master and slave clocks, comprising the step of:

at said Step (6), calculating the transmission time $T_{TR}$ according to the equation $$T_{TR} = [(MT_0 - MT_1) + (ST_1 - ST_0)*k_{clkratio}]/2$$

where $k_{clkratio}$ is the ratio of the frequency of said master clock to the frequency of said slave clock.

34. The method according to claim 14, 15, 17, 18, 24, 25, 27, 28, 29, 30, 31, 32 or 33, comprising the additional steps of:

acquiring data from a transducer operatively associated with each slave clock;

sampling and processing said data to generate a processed data set; and further processing said processed data set utilizing said clock frequency ratio and reference time parameters to provide a desired data set containing a series of data referenced to said master clock.

35. A method for referencing data acquired at times measured by at least one slave clock to times associated with a master clock, said master clock providing a master clock time signal having associated master clock time values, said slave clock providing a slave clock time signal having associated slave clock time values, said method comprising the steps of:

(1) sequentially transmitting at least one time reference signal from said slave clock to said master clock;

(2) determining the value of said master clock time signal when each of said time reference signals is received by said master clock;

(3) sequentially transmitting from said master clock to said slave clock at least two time information signals, at least one of said time information signals containing information dependent upon the times of reception of said time reference signals and other information dependent upon the times of transmission of said time information signals;

(4) upon receipt of said time information signals at said slave clock, determining the parameters corresponding to (i) the reference time relationship between the master and slave clocks, and (ii) the ratio of the frequencies of said clocks;

(5) acquiring data from a transducer operatively associated with said slave clock;

(6) sampling said data and storing information as to the value of each sample of data acquired and the time of acquisition thereof as measured by said slave clock; and (7) processing the stored information utilizing at least one of said parameters to provide a series of data sets comprising said data samples together with the times of acquisition thereof as measured by values of time corresponding to the time values generated by said master clock.

36. A method for referencing at least one slave clock to a master clock, said master clock providing a master clock time signal, said slave clock providing a slave clock time signal, said method comprising the steps of:

sequentially transmitting a first set of signals from said slave clock to said master clock and a second set of signals from said master clock to said slave clock, at least one of said sets of signals containing time reference information respecting said time signals;

utilizing said time reference information and information respecting the other of said sets of signals to determine a reference time value corresponding to the difference between the values of said master and slave clock time signals at a particular time as measured by a predetermined value of said slave clock time signal; and at a later time, determining a particular value of said master clock time signal corresponding to said predetermined value of said slave clock time signal, by adding said reference time value to the predetermined value of said slave clock time signal.

37. The method according to claim 36, wherein said slave clock time signal is periodically incremented, comprising the additional step of determining the clock ratio of the frequency of said master clock to the frequency of said slave clock, by calculating the ratio of (i) the time interval between the times of transmission of two signals successively transmitted between the master and slave clocks as measured by the transmitting clock to (ii) the time interval between the times of reception of said signals as measured by the receiving clock; and determining a particular value of said master clock time signal by adding the value of said reference time to the product of the number of increments of said slave clock time signal with said clock ratio.

38. The method according to claim 37, wherein said particular value is adjusted by incrementing the predetermined value of said slave clock time signal by an incremental amount corresponding to the product of (i) the number of slave clock time signal increments between said slave clock time signal and the slave clock time corresponding to said predetermined value and (ii) said clock ratio, and adding the value of the incremented slave clock time signal to said reference time value.

39. A method for referencing at least one slave clock to a master clock, said master clock providing a periodically incremented master clock time signal, said slave clock providing a periodically incremented slave clock time signal, said method comprising the steps of:

sequentially transmitting a first set of signals from said slave clock to said master clock and a second set of signals from said master clock to said slave clock, at least one of said sets of signals containing time reference information respecting said time signals;

determining a clock ratio of the frequency of said master clock to the frequency of said slave clock, by calculating the ratio of (i) the time interval between the times of transmission of two signals successively transmitted between the master and slave clocks as measured by the transmitting clock to (ii) the time interval between the times of reception of said signals as measured by the receiving clock;

utilizing said clock ratio, said time reference information and information respecting the other of said sets of signals to determine a reference time value corresponding to the difference between the values of said master and slave clock time signals at a particular time as measured by a predetermined value of said slave clock time signal; and at a later time, determining a particular value of said master clock time signal corresponding to another value of said slave clock time signal, by adjusting the predetermined value of said slave clock time signal by an incremental amount corresponding to the product of (i) the number of increments of said slave clock time signal between said particular time and the time corresponding to said other value of said slave clock time signal and (ii) said clock ratio to obtain an adjusted slave clock time value, and adding said reference time value to said adjusted slave clock time value.

40. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a second time signal having the value $MT_0$;

(4) subsequently transmitting from said master clock to said slave clock a third time signal having a value $MT_1$ corresponding to the value of said master clock time signal when said third time signal is transmitted;

(5) determining a value $ST_1$ of said slave clock time signal when said third time signal is received by said slave clock; and (6) upon receipt of said second and third time signals at said slave clock, determining a ratio $k_{clkratio}$ of the frequency of the master clock to the frequency of the slave clock according to the relation $$k_{clkratio} = (MT_1 - MT_0)/(ST_1 - ST_0).$$

41. A method for referencing at least one auxiliary slave clock to a master clock via an intermediate slave clock, said master clock providing a periodically incremented master clock time signal, said intermediate slave clock providing a periodically incremented intermediate slave clock time signal, said auxiliary slave clock providing a periodically incremented auxiliary slave clock time signal, said method comprising the steps of:

sequentially transmitting a first set of signals from said intermediate slave clock to said master clock and a second set of signals from said master clock to said intermediate slave clock, at least one of said sets of signals containing time reference information respecting said time signals;

determining a primary clock ratio of the frequency of said master clock to the frequency of said intermediate slave clock, by calculating the ratio of (i) the time interval between the times of transmission of two signals successively transmitted between the master and intermediate slave clocks as measured by the transmitting clock to (ii) the time interval between the times of reception of said signals as measured by the receiving clock;

utilizing said primary clock ratio, said time reference information and information respecting the other of said sets of signals to determine a primary reference time value corresponding to the difference between the values of said master and intermediate slave clock time signals at a particular time as measured by a prior value of said intermediate slave clock time signal;

determining a secondary clock ratio of the frequency of said intermediate slave clock to the frequency of said auxiliary slave clock;

determining a secondary reference time value corresponding to the difference between the values of said intermediate and auxiliary slave clock time signals at a particular time as measured by a prior value of sad auxiliary slave clock time signal; and at a later time, determining a particular value of said master clock time signal corresponding to another value of said auxiliary clock time signal utilizing a composite clock ratio equal to the product of said primary and secondary clock ratios and a composite reference time equal to the sum of said primary reference time and the product of said secondary reference time and said primary clock ratio.

42. A method for referencing a master clock to at least one slave clock, said master clock providing a master clock time signal having a value MT, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a second time signal having the value $MT_0$;

(4) subsequently transmitting from said master clock to said slave clock a third time signal having a value $MT_1$ corresponding to the value of said master clock time signal when said third time signal is transmitted;

(5) determining a value $ST_1$ of said slave clock time signal when said third time signal is received by said slave clock;

(6) upon receipt of said second and third time signals at said slave clock, determining a virtual clock reference time $t_{ref}$ given by $$t_{ref}=[(MT_0+MT_1)-(ST_0+ST_1)*k_{clkratio}]/2$$

where $k_{clkratio}=(MT_1-MT_0)/(ST_1-ST_0)$; and (7) calculating the number of slave clock time signal increments $n_{pc}$ from the starting time of the slave clock corresponding to the master clock time MT according to the relation $$n_{pc}=(MT-t_{ref})/k_{clkratio}.$$

43. A method for referencing at least one slave clock to a master clock, said master clock providing a master clock time signal, said slave clock providing a periodically incremented slave clock time signal, said method comprising the steps of:

(1) transmitting from said slave clock to said master clock a first time signal having a value $ST_0$ corresponding to the value of said slave clock time signal when said first time signal is transmitted;

(2) determining a value $MT_0$ of said master clock time signal when said first time signal is received by said master clock;

(3) subsequently transmitting from said master clock to said slave clock a time information signal indicative of the difference $MT_1-MT_0$ between (i) a value $MT_1$ of said master clock time signal when said time information signal is transmitted and (ii) the value $MT_0$;

(4) determining a value $ST_1$ of said slave clock time signal when said third time signal is received by said slave clock; and (5) upon receipt of said second and third time signals at said slave clock, determining a ratio $k_{clkratio}$ of the frequency of the master clock to the frequency of the slave clock according to the relation $$k_{clkratio}=(MT_1-MT_0)/(ST_1-ST_0).$$

* * * * *